United States Patent
Tyni et al.

(10) Patent No.: US 10,486,117 B2
(45) Date of Patent: Nov. 26, 2019

(54) METHOD, APPARATUS AND SYSTEM FOR AFTERTREATMENT OF EXHAUST GAS COMPRISING INLINE HOUSING

(71) Applicant: Proventia Oy, Oulunsalo (FI)

(72) Inventors: Tuomas Tyni, Liminka (FI); Sauli Halonen, Oulu (FI); Juha Karhu, Oulu (FI)

(73) Assignee: Proventia Oy, Oulunsalo (FI)

( * ) Notice: Subject to any disclaimer, the term of this patent is extended or adjusted under 35 U.S.C. 154(b) by 0 days.

(21) Appl. No.: 15/817,980

(22) Filed: Nov. 20, 2017

(65) Prior Publication Data

US 2018/0326372 A1    Nov. 15, 2018

(30) Foreign Application Priority Data

Nov. 23, 2016  (GB) .................................. 1619790.7

(51) Int. Cl.
*B01F 5/00* (2006.01)
*B01F 5/02* (2006.01)
(Continued)

(52) U.S. Cl.
CPC .......... *B01F 5/0065* (2013.01); *B01D 53/944* (2013.01); *B01D 53/9431* (2013.01);
(Continued)

(58) Field of Classification Search
CPC .... B01F 5/0065; B01F 5/0451; F01N 13/009; F01N 3/021; F01N 3/2066
(Continued)

(56) References Cited

U.S. PATENT DOCUMENTS

| | | | |
|---|---|---|---|
| 7,748,212 B2 * | 7/2010 | Sedlacek ................. | F01N 13/08 60/274 |
| 2003/0079467 A1 * | 5/2003 | Liu ...................... | B01F 3/04049 60/286 |

(Continued)

FOREIGN PATENT DOCUMENTS

| | | |
|---|---|---|
| DE | 102015104540 B3 | 2/2016 |
| EP | 2840241 A1 | 2/2015 |

(Continued)

OTHER PUBLICATIONS

Great Britain Intellectual Property Office, Application No. GB1619790. 7, dated May 8, 2017, 6 pages.

(Continued)

*Primary Examiner* — Tom P Duong
(74) *Attorney, Agent, or Firm* — Ziegler IP Law Group, LLC

(57) ABSTRACT

An apparatus for aftertreatment of exhaust gas including a housing having a longitudinal axis that extends between a first end and a second end of the housing; an exhaust inlet being positioned at a portion of the first end of the housing for entering exhaust gas flow into the interior of the housing; a first substrate being positioned within the interior of the housing downstream to the exhaust inlet, wherein the exhaust gas flow being configured to flow through the first substrate in direction of the longitudinal axis; mixer arrangement being positioned within the interior of the housing downstream to the first substrate and including: first flow guide arrangement configured to guide the exhaust gas flow to rotating and advancing gas flow in direction of a crosswise axis perpendicular to the longitudinal axis; a reactant inlet for dispensing reactant to the rotating and advancing gas flow, the reactant configured to mix with the exhaust gas; and second flow guide arrangement configured to guide the rotating and advancing mixed gas flow in direction of the (Continued)

longitudinal axis as a mixed exhaust gas flow; and a second substrate being positioned within the interior of the housing downstream to the mixer arrangement, wherein the mixed exhaust gas flow being configured to flow through the second substrate in direction of the longitudinal axis.

18 Claims, 10 Drawing Sheets

(51) Int. Cl.

| | | |
|---|---|---|
| B01F 5/04 | (2006.01) | |
| B01F 5/06 | (2006.01) | |
| B01F 3/04 | (2006.01) | |
| F01N 3/10 | (2006.01) | |
| F01N 3/20 | (2006.01) | |
| F01N 3/28 | (2006.01) | |
| F01N 3/021 | (2006.01) | |
| F01N 13/00 | (2010.01) | |
| B01D 53/94 | (2006.01) | |

(52) U.S. Cl.
CPC ...... *B01F 3/04021* (2013.01); *B01F 3/04049* (2013.01); *B01F 5/0268* (2013.01); *B01F 5/0451* (2013.01); *B01F 5/0606* (2013.01); *B01F 5/0648* (2013.01); *B01F 5/0689* (2013.01); *F01N 3/021* (2013.01); *F01N 3/103* (2013.01); *F01N 3/106* (2013.01); *F01N 3/208* (2013.01); *F01N 3/2066* (2013.01); *F01N 3/2892* (2013.01); *F01N 13/009* (2014.06); *F01N 13/0097* (2014.06); *B01D 2255/915* (2013.01); *B01F 2005/0017* (2013.01); *B01F 2005/0034* (2013.01); *B01F 2005/0091* (2013.01); *F01N 2240/20* (2013.01); *F01N 2610/02* (2013.01); *Y02T 10/24* (2013.01)

(58) Field of Classification Search
USPC .................................................. 422/176, 177
See application file for complete search history.

(56) References Cited

U.S. PATENT DOCUMENTS

| | | | |
|---|---|---|---|
| 2010/0199645 A1* | 8/2010 | Telford | B01F 3/04049 60/295 |
| 2011/0308234 A1* | 12/2011 | De Rudder | B01F 3/04049 60/295 |
| 2013/0247545 A1 | 9/2013 | Solbrig et al. | |
| 2014/0044603 A1 | 2/2014 | Greber | |
| 2014/0196440 A1 | 7/2014 | Katou et al. | |
| 2014/0334988 A1* | 11/2014 | Stanavich | B01D 53/9431 422/177 |
| 2016/0215673 A1* | 7/2016 | Noren, IV | F01N 3/2892 |

FOREIGN PATENT DOCUMENTS

| | | |
|---|---|---|
| JP | 2010116859 A | 5/2010 |
| JP | 2016188579 A | 11/2016 |
| WO | 2013105336 A1 | 7/2013 |
| WO | 2016118720 A1 | 7/2016 |

OTHER PUBLICATIONS

Extended European Search Report received for European Patent Application No. EP17201847.5, dated Jan. 19, 2018, 8 pages.

* cited by examiner

METHOD, APPARATUS AND SYSTEM FOR AFTERTREATMENT OF EXHAUST GAS COMPRISING INLINE HOUSING

TECHNICAL FIELD

The present application generally relates to a system, method and apparatus for aftertreatment of exhaust gas.

BACKGROUND ART

Emission regulations for internal combustion engines have tightened over recent years, and the trend is even tightening. For example, regulated emissions of NOx and particles from internal combustion engines are becoming so low that the target emissions levels are hard to be met. Therefore, aftertreatment systems are used in engines to reduce emissions. For reducing NOx emissions, NOx reduction catalysts, including selective catalytic reduction (SCR) systems, are utilized to convert NOx (NO and NO2) to N2 and other compounds. SCR systems utilize a reactant, such as ammonia, to reduce the NOx.

Simultaneously with the emission regulation demands, also power and efficiency demands for engines increase. On top of that the internal combustion engines should be designed and manufactured with smaller size, inline design and decreased weight, if possible.

A solution is needed for cost-efficiently providing an aftertreatment system of exhaust gas for internal combustion engine to reduce emissions capable of fulfilling the requirements for emission regulations without sacrificing too much power and efficiency of the engine and do all this in compact size with inline housing design.

SUMMARY

According to a first example aspect of the disclosed embodiments there is provided an apparatus for aftertreatment of exhaust gas comprising:

a housing having a longitudinal axis that extends between a first end and a second end of the housing;

an exhaust inlet being positioned at a portion of the first end of the housing for entering exhaust gas flow into the interior of the housing;

mixer arrangement being positioned within the interior of the housing downstream to the exhaust inlet and comprising:

first flow guide arrangement configured to guide the exhaust gas flow to rotating and advancing gas flow in direction of a crosswise axis perpendicular to the longitudinal axis;

a reactant inlet for dispensing reactant to the rotating and advancing gas flow, the reactant configured to mix with the exhaust gas; and second flow guide arrangement configured to guide the rotating and advancing mixed gas flow in direction of the longitudinal axis as a mixed exhaust gas flow; and a substrate being positioned within the interior of the housing downstream to the mixer arrangement, wherein the mixed exhaust gas flow being configured to flow through the second substrate.

In an embodiment, the exhaust inlet being positioned at an end portion of the first housing end, the inlet having a central axis parallel to the longitudinal axis of the housing.

In an embodiment, the exhaust gas flow being configured to flow in direction of the longitudinal axis between the exhaust inlet and the mixer arrangement and through the second substrate.

In an embodiment, a first substrate is positioned within the interior of the housing downstream to the exhaust inlet, wherein the exhaust gas flow being configured to flow through the first substrate in direction of the longitudinal axis, and a second substrate is positioned within the interior of the housing downstream to the mixer arrangement, wherein the mixed exhaust gas flow being configured to flow through the second substrate in direction of the longitudinal axis.

In an embodiment, the first substrate comprises at least one of the following:
a diesel oxidation catalyst (DOC) substrate; and
a diesel particulate filter (DPF).

In an embodiment, the second substrate comprises at least one of the following:
a selective catalytic reduction (SCR) substrate; and
a diesel particulate filter (DPF).

In an embodiment, the apparatus further comprises flow distribution arrangement positioned within the interior of the housing downstream to the mixer arrangement and upstream to the second substrate, the flow distribution arrangement comprising:

a first flow distribution element extending across the mixed exhaust gas flow as an U-shape first plate configured to divide the mixed exhaust gas flow to two sub flows exiting the first flow distribution element from opposite ends of the U-shape first plate within the interior of the housing;

a second flow distribution element, downstream to the first flow distribution element, extending across the interior of the housing at least partially as a concave or a conical second plate, at least two openings defined by the second plate extending radially outwardly from a central portion of the second plate, the openings increase in size as extending radially away from the central portion of the second plate, wherein each sub flow is allowed to flow within the interior of the housing above upstream surface of the second plate, a tubular inner surface of the housing configured to divide each sub flow to two radial sub flows, wherein the further two sub flows advancing radially in opposite directions to meet and mix with corresponding two radial sub flows originating from another sub flow and to enter the openings towards the second substrate as a distributed gas flow in direction of the longitudinal axis.

In an embodiment,
the first flow guide arrangement comprises
at least one elongated blade extending across at least a portion of the interior of the housing; and
a perforated tubular element, wherein at least part of the exhaust gas is configured to enter an interior of the perforated tubular element through apertures, and the perforated tubular element being configured to guide the exhaust gas to rotating and advancing movement in direction of a crosswise axis perpendicular to the longitudinal axis, wherein a center flow advances inside the perforated tubular element in direction of the crosswise axis and the edge flow rotates and advances around the perforated tubular element in direction of the crosswise axis, and the perforated tubular element is conical;

the reactant inlet is configured to dispense a reactant into the interior of the perforated tubular element in direction of the crosswise axis from a first end of the perforated tubular element towards a second end of the perforated tubular element; and the second flow guide comprising a cup-shaped cylindrical element extending in direction of the crosswise axis outside an external surface of the housing and enhancing interior of the housing, wherein an inner diameter of the cup-shaped cylindrical element is greater than an outer diameter of the second end of the perforated tubular element.

In an embodiment, the apparatus further comprises a non-perforated tubular element downstream to the perforated tubular element and upstream to the cup-shaped cylindrical element, configured to guide at least part of the flow in direction of the crosswise axis towards the cup-shaped cylindrical element, a diameter of the non-perforated tubular element being greater than a diameter of a second end of the perforated tubular element and allowing a part of the rotating and advancing edge flow around the perforated tubular element to enter the non-perforated tubular element, and the cup-shaped cylindrical element comprising a circular open end, the diameter of the circular open end being greater than a diameter of a solid tubular element.

In an embodiment, the first flow guide arrangement is configured to guide the exhaust gas flow to rotating and advancing gas flow in first direction of a crosswise axis perpendicular to the longitudinal axis; and a reactant inlet is configured to dispense reactant in second direction of a crosswise axis perpendicular to the longitudinal axis, the second direction being opposite to the first direction.

In an embodiment, the first flow guide arrangement comprises:
  at least one elongated blade extending across a first part of the interior of the housing to guide the exhaust gas flow in direction of the longitudinal axis to a second part of the interior of the housing, the first part located above the second part;
  at least one curved blade located in the second part of the interior of the housing to guide the exhaust gas flow to rotating and advancing movement in direction of a crosswise axis perpendicular to the longitudinal axis; and
  a second surface of a block blade facing the second part of the interior of the housing preventing the rotating and advancing exhaust gas flow to access the first part of the interior of the housing;
  a non-perforated tubular element allowing the rotating and advancing exhaust gas flow to enter a second open end of an interior of the non-perforated tubular element in the first direction of a crosswise axis perpendicular to the longitudinal axis;
  the second flow guide arrangement comprising:
    a cup-shaped cylindrical element, wherein an inner diameter of the cup-shaped cylindrical element is greater than an outer diameter of a first open end of the non-perforated tubular element, wherein side wall of the cup-shaped cylindrical element extends to direction of a crosswise axis and overlaps a portion of side wall of the non-perforated tubular element; and
    a first surface of the block blade facing the cup-shaped cylindrical element and guiding the exhaust gas flow to direction of the longitudinal axis; and
    the reactant inlet arranged to a closed base of the cup-shaped cylindrical element and configured to dispense a reactant into the interior of the cup-shaped cylindrical element in second direction opposite to the first direction of the crosswise axis towards the first open end of the non-perforated tubular element.

In an embodiment, the first flow guide arrangement comprises:
  at least one elongated blade extending across a first part of the interior of the housing to guide the exhaust gas flow in direction of the longitudinal axis to a second part of the interior of the housing, the first part located above the second part;
  at least one curved blade located in the second part of the interior of the housing to guide the exhaust gas flow to rotating and advancing movement in direction of a crosswise axis perpendicular to the longitudinal axis; and
  a second surface of a block blade facing the second part of the interior of the housing preventing the rotating and advancing exhaust gas flow to access the first part of the interior of the housing;
  a tubular element arranged in direction of cross-axis allowing the rotating and advancing exhaust gas flow to enter an interior of the perforated tubular through openings located within a second portion of the tubular element exposed to the second part of the interior of the housing, whereas a first portion of the tubular element exposed to the first part of the interior of the housing is non-perforated;
  the second flow guide arrangement comprising:
    a cup-shaped cylindrical element, wherein an inner diameter of the cup-shaped cylindrical element is greater than an outer diameter of an open end of the first portion of the tubular element, wherein side wall of the cup-shaped cylindrical element extends to direction of a crosswise axis and overlapping a portion of side wall of the first portion of the tubular element; and
    a first surface of the block blade facing the cup-shaped cylindrical element and guiding the exhaust gas flow to direction of the longitudinal axis; and
    the reactant inlet is arranged to a closed base of the cup-shaped cylindrical element and configured to dispense a reactant into the interior of the cup-shaped cylindrical element in second direction opposite to the first direction of the crosswise axis towards the open end of the tubular element.

In an embodiment, a peripheral surface of the tubular element comprises openings and fins corresponding to the openings to guide exhaust gas flow to flow through the openings into the tubular element.

In an embodiment, the first flow guide arrangement further comprises an elongated pole member extending in direction of a crosswise axis and located in the second part of the interior of the housing, outer diameter of the elongated cylindrical pole member being smaller than inner diameter of the non-perforated tubular element, a first end of the elongated pole member extending partially inside the non-perforated tubular element and a second end of the elongated pole member attached to an internal surface of the housing within the second part of the interior of the housing.

In an embodiment, the elongated pole member is cylindrical.

In an embodiment, the elongated pole member comprises a conical first end.

In an embodiment, the elongated pole member is a perforated tubular element. The perforated tubular element may be conical.

In an embodiment, the first flow guide arrangement further comprises an elongated pole member extending in direction of a crosswise axis and located in the second part of the interior of the housing, outer diameter of the elongated cylindrical pole member being smaller than inner diameter of the non-perforated tubular element, a first end of the elongated pole member not extending inside the non-perforated tubular element and a second end of the elongated pole member attached to an internal surface of the housing within the second part of the interior of the housing.

In an embodiment, the first flow guide arrangement comprises:
  at least one elongated blade extending across a first part of the interior of the housing to guide the exhaust gas flow in direction of the longitudinal axis to a second part of the interior of the housing, the first part located above the second part;

at least one curved blade located in the second part of the interior of the housing to guide the exhaust gas flow to rotating and advancing movement in direction of a crosswise axis perpendicular to the longitudinal axis;

a perforated tubular element, wherein at least part of the exhaust gas is configured to enter an interior of the perforated tubular element through apertures, and the perforated tubular element being configured to guide the exhaust gas to rotating and advancing movement in direction of a crosswise axis perpendicular to the longitudinal axis, wherein a center flow advances inside the perforated tubular element in direction of the crosswise axis and the edge flow rotates and advances around the perforated tubular element in direction of the crosswise axis, and the perforated tubular element is conical;

a non-perforated tubular element allowing the rotating and advancing exhaust gas flow to enter a second open end of an interior of the non-perforated tubular element in the first direction of a crosswise axis perpendicular to the longitudinal axis through a gap between the non-perforated tubular element and the perforated tubular element, wherein the inner diameter of the non-perforated tubular element is bigger than the outer diameter of the perforated tubular element; and a second surface of a block blade facing the second part of the interior of the housing preventing the rotating and advancing exhaust gas flow to access the first part of the interior of the housing outside the gap; the reactant inlet is configured to dispense a reactant into the interior of the perforated tubular element in direction of the crosswise axis from a second end of the perforated tubular element towards a first end of the perforated tubular element; and the second flow guide arrangement comprising:

a cup-shaped cylindrical element, wherein an inner diameter of the cup-shaped cylindrical element is greater than an outer diameter of a downstream open end of the non-perforated tubular element, wherein side wall of the cup-shaped cylindrical element extends to direction of a crosswise axis and overlapping a portion of side wall of the non-perforated tubular element; and a first surface of the block blade facing the cup-shaped cylindrical element and guiding the exhaust gas flow to direction of the longitudinal axis.

In an embodiment, the first flow guide arrangement comprises a mixing element, wherein the exhaust gas flow is configured to enter an interior of the element through an inlet opening in a first part of the interior of the housing, the first part located above the second part, and the opening is located above a central axis of the housing, and the mixing element being configured to guide the exhaust gas to rotating and advancing movement in direction of a crosswise axis perpendicular to the longitudinal axis inside the element, and the mixing element being spherical or cylindrical;

the reactant inlet is configured to dispense a reactant into the interior of the mixing element in direction of the crosswise axis from a first end of the mixing element in the first part towards a second end of the mixing element in the second part; and the second flow guide comprising an outlet opening in a second part of the interior of the housing, and the opening is located below a central axis of the housing, and the outlet opening being configured together with an inner surface of the housing to guide the rotating and advancing mixed gas flow in direction of the longitudinal axis as a mixed exhaust gas flow.

According to a second example aspect of the disclosed embodiments there is provided a combustion engine comprising an apparatus for aftertreatment of exhaust gas of the first aspect.

Different non-binding example aspects and embodiments of the present invention have been illustrated in the foregoing. The above embodiments are used merely to explain selected aspects or steps that may be utilized in implementations of the present dislcosure. Some embodiments may be presented only with reference to certain example aspects of the invention. It should be appreciated that corresponding embodiments may apply to other example aspects as well.

BRIEF DESCRIPTION OF THE DRAWINGS

The disclosed embodiments will be described, by way of example only, with reference to the accompanying drawings, in which.

DETAILED DESCRIPTION

In the following description, like numbers denote like elements.

Figure 1:
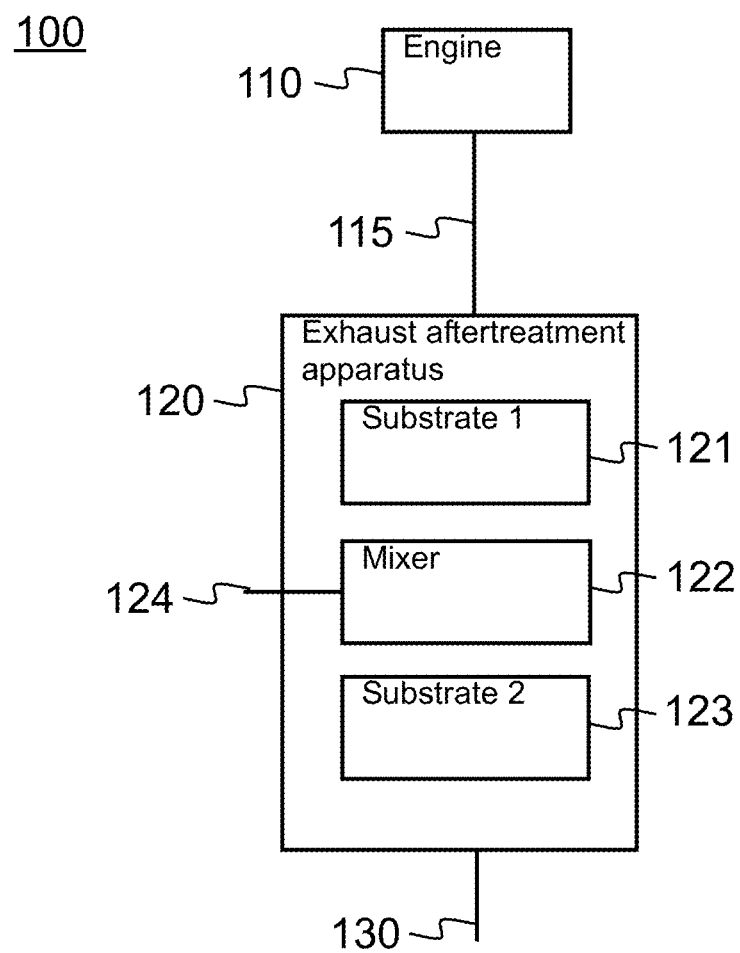
FIG. 1 shows a schematic picture of a system according to an example embodiment of the present disclosure.

FIG. 1 shows a schematic picture of a system according to an example embodiment of the invention. An engine system 100 is shown. The engine system 100 comprises an engine 110 and an exhaust aftertreatment apparatus 120. Furthermore, the system 100 may comprise other devices that are not shown in the FIG. 1. Such devices comprise, for example, a fuel storage for the engine 110 (e.g. diesel), and an air intake device including an air filter.

FIG. 1 shows a connection 115 between the engine 110 and the exhaust aftertreatment apparatus 120. The connection 115 may comprise a pipe for guiding exhaust gas from the engine 110, for example.

The exhaust aftertreatment apparatus 120 receives the exhaust gas from the engine 110 over the connection 115. In an embodiment, the apparatus 120 comprises a first substrate 121 (for example a catalytic converter, such as diesel oxidation catalyst (DOC) device and/or a filter, such as a diesel particulate filter (DPF), a mixer 122 and a second substrate 123 (for example a selective catalytic reduction (SCR) device). The devices 121-123 are in an embodiment implemented within the same housing of the apparatus 120 but at least one of the devices 121, 123 may also be placed outside the housing of the apparatus 120. A connection 124 for receiving reactant for the mixer 122 is also disclosed. The apparatus 120 may further comprise devices not shown in FIG. 1, such as doser for the reactant, a storage for the reactant (such as urea or ammonia), gas flow guides and connections within the apparatus 120.

First substrates 121, such as catalytic converters (diesel oxidation catalysts or DOC's) are typically used in an exhaust system to convert undesirable gases such as carbon monoxide and hydrocarbons from engine's exhaust into carbon dioxide and water. DOC's may have different configurations. The substrates used in catalytic converters preferably include a catalyst.

Another first substrates 121, such as a diesel particulate filter (DPF) may also be implemented together or alternatively to the DOC in an exhaust system to remove particulate matter (e.g., carbon based particulate matter such as soot) from the exhaust. DPF's can have a variety of known configurations.

The second substrate 123, such as the selective catalytic reduction (SCR) catalyst device is typically used in an exhaust system to remove undesirable gases such as nitrogen oxides (NOx) from the engine's emissions. SCR's are capable of converting NOx to nitrogen and oxygen in an oxygen rich environment with the assistance of reactants such as urea or ammonia, which are injected into the exhaust gas upstream of the SCR device 123.

A mixer 122 is configured to receive exhaust gas from the engine 110 over connection 115, which gas is possibly run through a first substrate 121, such as DOC or DPF, as disclosed above. The mixer 122 receives also reactant, such as diesel exhaust fluid (DEF), over the connection 124, the reactant commonly referred to as AdBlue™ that is an aqueous urea solution made with 32.5% high-purity urea and 67.5% deionized water. DEF may be used as a consumable in selective catalytic reduction (SCR) in order to lower NOx concentration in the diesel exhaust emissions from diesel engines. The mixer 122 is configured to mix the exhaust gas and the reactant and also to reduce urea deposits in exhaust pipelines. When SCR process uses DEF, it can cause urea deposits in exhaust pipes, especially in off-road applications using airless DEF injectors. Larger DEF spray droplets might lead to wall wetting and film formation on exhaust pipe inner surfaces, causing deposits when the local temperatures are low. Urea deposit problems have become frequent and critical, and the mixer 122 is configured to keep pipelines clean by evenly distributing the reactant to the exhaust gas in the shortest possible pipe length and avoiding this way the wall wetting and film formation.

The apparatus 120 may also help water evaporation from DEF and ensures optimal reactions with the reactant with no unwanted side effects. The apparatus 120 may be used with all reactant dosers (e.g. urea or ammonia) to achieve even NH3 distribution within the exhaust gas. Further benefit is experienced with airless injectors, which have rather large Sauter mean diameter (SMD) and when the injection must start at low temperatures. An exhaust gas outlet pipe 130 guides the aftertreated exhaust gas from the apparatus 120.

In an embodiment, the apparatus 120 is configured to inject small droplets of reactant, such as urea-water solution, to the exhaust gas flow and causing the reactant to vaporize in an exhaust gas flow channel defined by interior of the housing of the apparatus housing and to react with the nitric oxides of the exhaust gas and changing them to plain nitrogen. Such final change to nitrogen takes place in SCR catalysator of the second substrate 123.

Figure 2A:
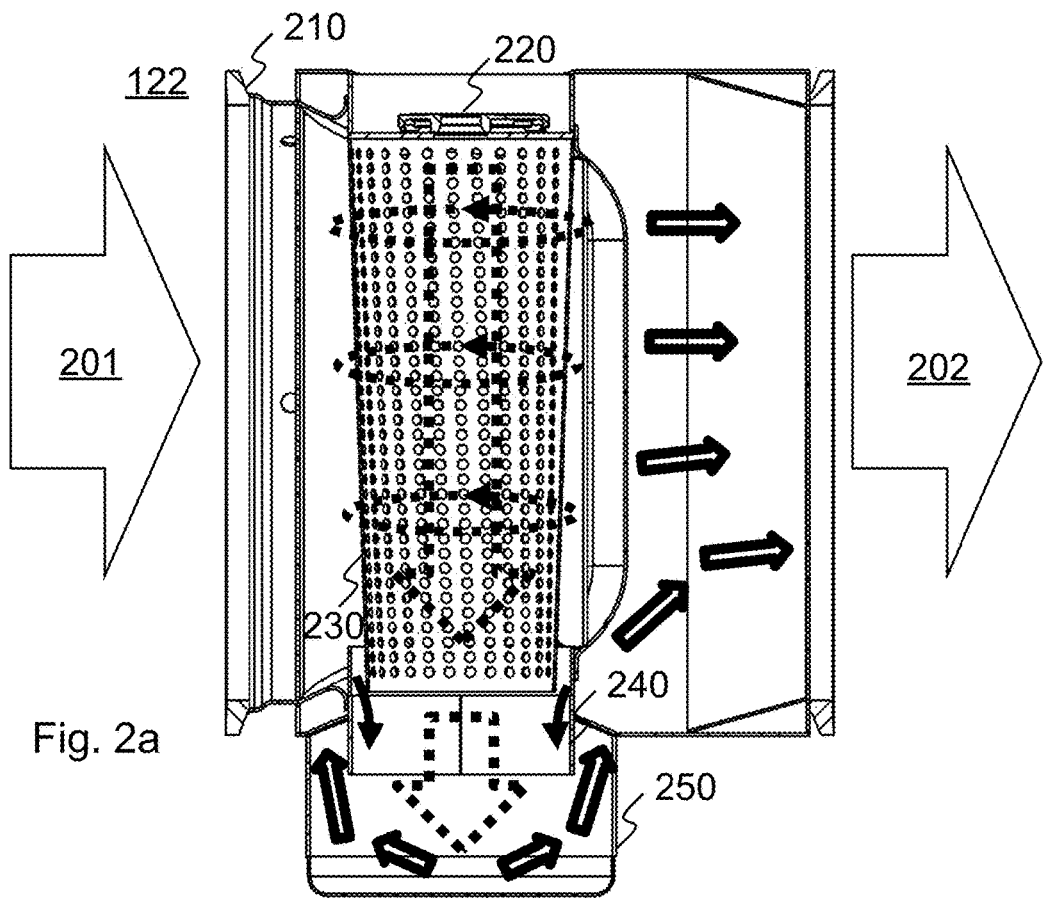
FIGS. 2*a-b* show schematic pictures of an apparatus according to a first example embodiment of the present disclosure.
Figure 2B:
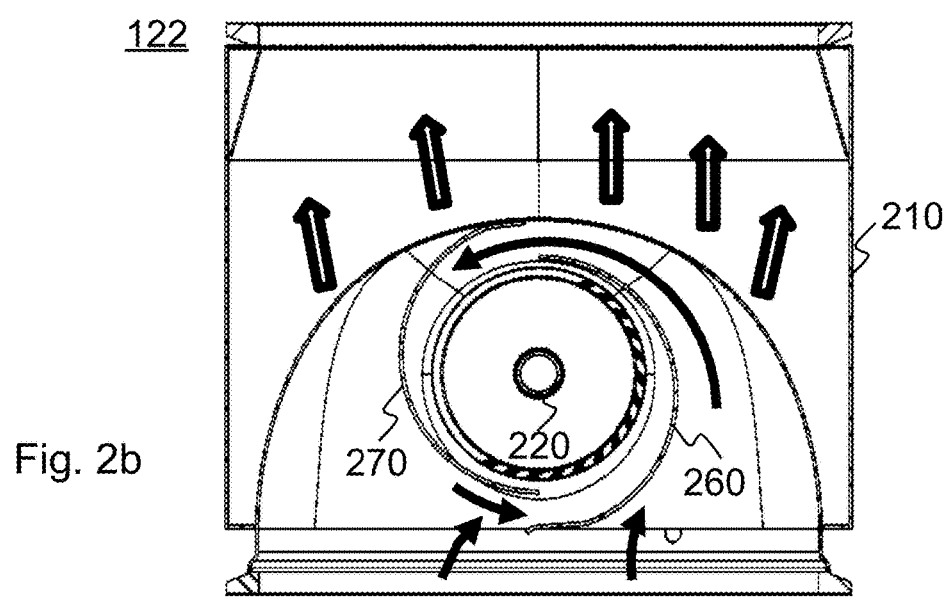

FIGS. 2a-b show schematic pictures of a mixer arrangement 122 according to an first example embodiment of the invention. FIG. 2a shows a view from side, wherein exhaust gas flow 201 enters and mixed exhaust gas flow 202 exits in direction of longitudinal axis (from left to right in FIG. 2a). FIG. 2b shows a view from above, wherein exhaust gas flow enters and mixed exhaust gas flow (flow arrows 201, 202 not shown) exits in direction of longitudinal axis (from down to up in FIG. 2b).

The mixer arrangement 122 for aftertreatment of exhaust gas comprises a housing 210, an exhaust inlet for incoming exhaust gas flow 201, a reactant inlet 220, and an exhaust outlet for outgoing mixed exhaust gas flow 202.

In an embodiment, the reactant inlet 220 comprises a nozzle.

The exhaust inlet is arranged to the housing 210 for entering input exhaust gas flow 201 to the mixer arrangement 122. The reactant inlet 220 is arranged to the housing 210 for dispensing reactant to the mixer arrangement 122, and the reactant is configured to mix with the input exhaust gas flow to provide mixed exhaust gas flow. The exhaust outlet is arranged to the housing 210 for exiting mixed exhaust gas flow from the mixer arrangement 122. Furthermore, the mixer arrangement 122 may comprise, for example, attachment elements for attaching the mixer arrangement 122 to an engine system or a chassis of a vehicle. The exhaust outlet may comprise an outlet duct.

In an embodiment, an apparatus 120 for aftertreatment of exhaust gas comprises a housing 210 having a longitudinal axis that extends between a first end and a second end of the housing; an exhaust inlet being positioned at a portion of the first end of the housing 210 for entering exhaust gas flow 201 into the interior of the housing 210; a first substrate (not shown) being positioned within the interior of the housing downstream to the exhaust inlet, wherein the exhaust gas flow being configured to flow through the first substrate in direction of the longitudinal axis. A mixer arrangement 122 is positioned within the interior of the housing 210 downstream to the first substrate and comprises first flow guide arrangement 230-240, 260-270 configured to guide the exhaust gas flow 201 in direction of the longitudinal axis to rotating and advancing gas flow in direction of a crosswise axis perpendicular to the longitudinal axis; a reactant inlet 220 for dispensing reactant to the rotating and advancing gas flow, the reactant configured to mix with the exhaust gas; and second flow guide arrangement 250 configured to guide the rotating and advancing mixed gas flow in direction of the longitudinal axis as a mixed exhaust gas flow 202; and a second substrate (not shown) being positioned within the interior of the housing 210 downstream to the mixer arrangement 122, wherein the mixed exhaust gas flow 202 is configured to flow through the second substrate in direction of the longitudinal axis.

In an embodiment, the first flow guide arrangement first flow guide arrangement 230-240, 260-270 comprises at least one elongated blade 260, 270 extending across at least a portion of the interior of the housing; a perforated tubular element 230, wherein at least part of the exhaust gas is configured to enter an interior of the perforated tubular element 230 through apertures, and the perforated tubular element 230 being configured to guide the exhaust gas to rotating and advancing movement (see arrows within and around the perforated tubular element 230) in direction of a crosswise axis perpendicular to the longitudinal axis, wherein a center flow advances inside the perforated tubular element in direction of the crosswise axis and the edge flow rotates and advances around the perforated tubular element 230 in direction of the crosswise axis, and the perforated tubular element 230 is conical.

The reactant inlet 220 is configured to dispense a reactant into the interior of the perforated tubular element 230 in direction of the crosswise axis from a first end (upper end in FIG. 2a) of the perforated tubular element 230 towards a second end (lower end in FIG. 2a) of the perforated tubular element 230; and the second flow guide 250 comprising a cup-shaped cylindrical element extending in direction of the crosswise axis outside an external surface of the housing 210 and enhancing interior of the housing, wherein an inner diameter of the cup-shaped cylindrical element is greater than an outer diameter of the second end of the perforated tubular element 230.

In an embodiment, a non-perforated tubular element 240 is arranged downstream to the perforated tubular element 230 and upstream to the cup-shaped cylindrical element 250, configured to guide at least part of the flow in direction of the crosswise axis towards the cup-shaped cylindrical element 250, a diameter of the non-perforated tubular element 240 being greater than a diameter of a second end of the perforated tubular element 230 and allowing a part of the rotating and advancing edge flow around the perforated tubular element 230 (see arrows through gap between elements 230-240) to enter the non-perforated tubular element 240. The cup-shaped cylindrical element 250 comprises a circular open end (upper end in FIG. 2a), the diameter of the circular open end being greater than a diameter of a second (lower) end of a non-perforated tubular element 240 enabling the mixed gas flow to flow around the non-perforated tubular element 240 towards a closed end (lower) of the cup-shaped cylindrical element 250 and to turn the mixed gas flow to flow through a gap between the inner surface of the circular open end of the cup-shaped cylindrical element 250 and the outer surface of the non-perforated tubular element 240 towards outlet to flow as mixed gas flow 202 in direction of the longitudinal axis.

In an embodiment, the mixer arrangement 122 comprises a first curved flow guide 260 and a second curved flow guide 270 extending at least across a portion of the exhaust inlet within an interior of the housing 210 for steering the entering exhaust gas flow in the interior to form a first flow path and a second flow path from the exhaust inlet circulating a perforated tubular element 230. An exhaust gas flow 201 is entering interior of the housing 210 of the mixer arrangement 122. A portion of the entering gas flow 201 enters a first flow path, wherein the first flow path comprises a first part between an outer wall of the first curved flow guide 260 and an inner wall of the housing 210; a second part between the inner wall of the housing and the perforated tubular element 230; and a third part between an inner wall of the second curved flow guide 270 and the perforated tubular element 230. A portion of the entering gas flow 201 enters a second flow path, wherein the second flow path comprises a first part between an outer wall of the second curved flow guide 270 and an inner wall of the first curved flow guide 260; a second part between the inner wall of the first curved flow guide 260 and the perforated tubular element 230; a third part between the inner wall of the housing 210 and the perforated tubular element 230; and a fourth part between an inner wall of the second curved flow guide 270 and the perforated tubular element 230.

In an embodiment, the first curved flow guide 260 extends from the exhaust inlet in the interior of the housing to a first direction around the perforated tubular element 230; and the second curved flow guide 270 extends from the exhaust inlet in the interior of the housing to a second direction around the perforated tubular element, as shown in FIG. 2b. Upstream ends of the first curved flow guide and the second curved flow guide that are adjacent to the exhaust inlet (lower open end in FIG. 2b) are at least partially overlapping with each other to provide a gap between the curved flow guides for the first part of the second flow path.

In an embodiment, the curved flow guides 260-270 may be of different lengths and curvatures. There may also be more than two curved flow guides installed.

In an embodiment, directions of a first flow path and a second flow path may be defined by arranging the flow guides 260-270 appropriately to direct the flows in desired direction around the perforated tubular element 230.

Figure 3A:
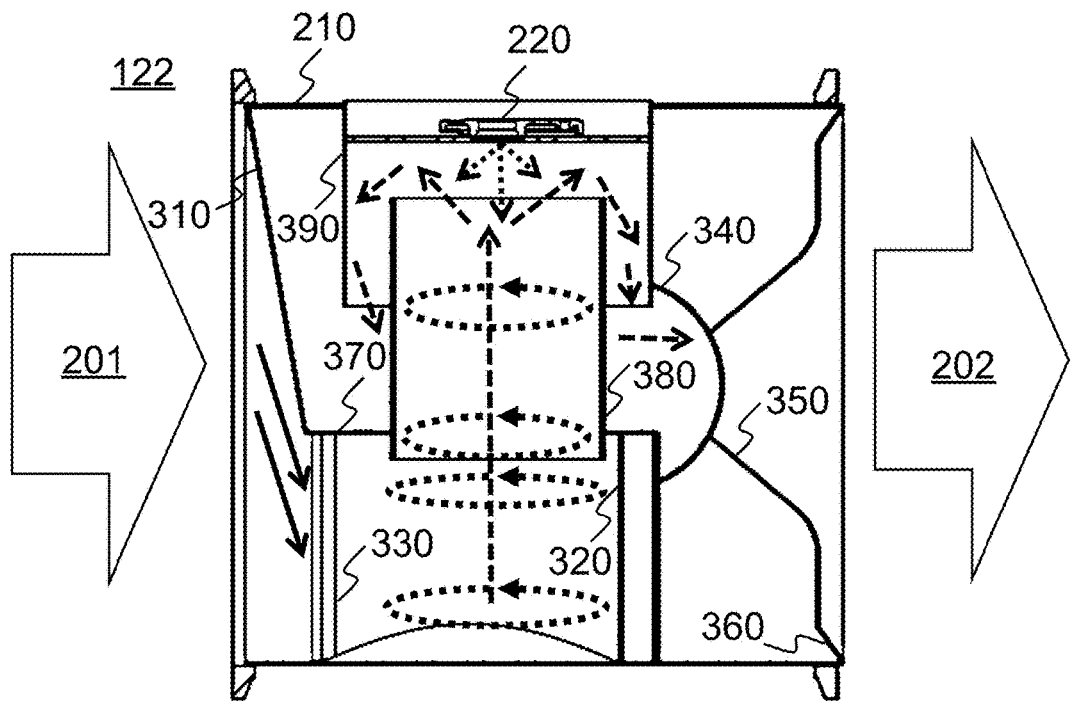
FIGS. 3*a-c* show schematic pictures of an apparatus according to second example embodiment of the present disclosure.
Figure 3B:
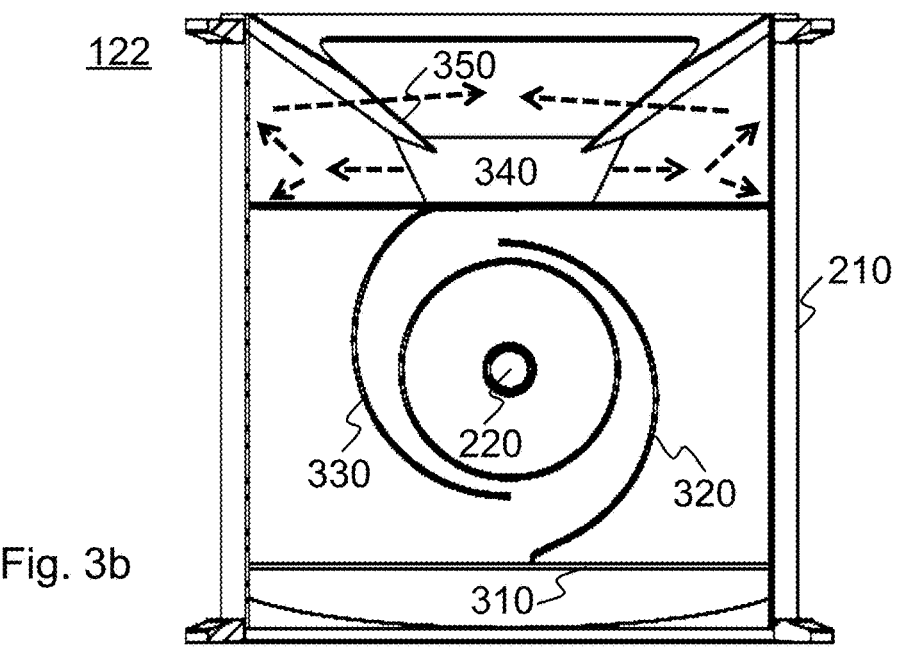
Figure 3C:
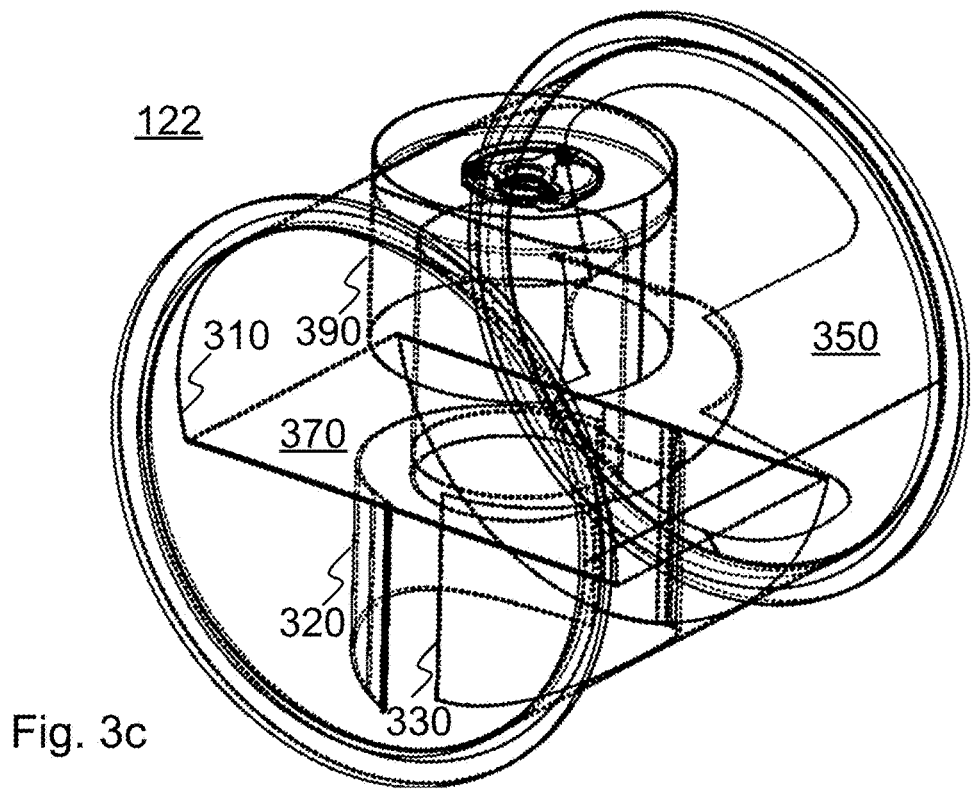
Figure 4A:
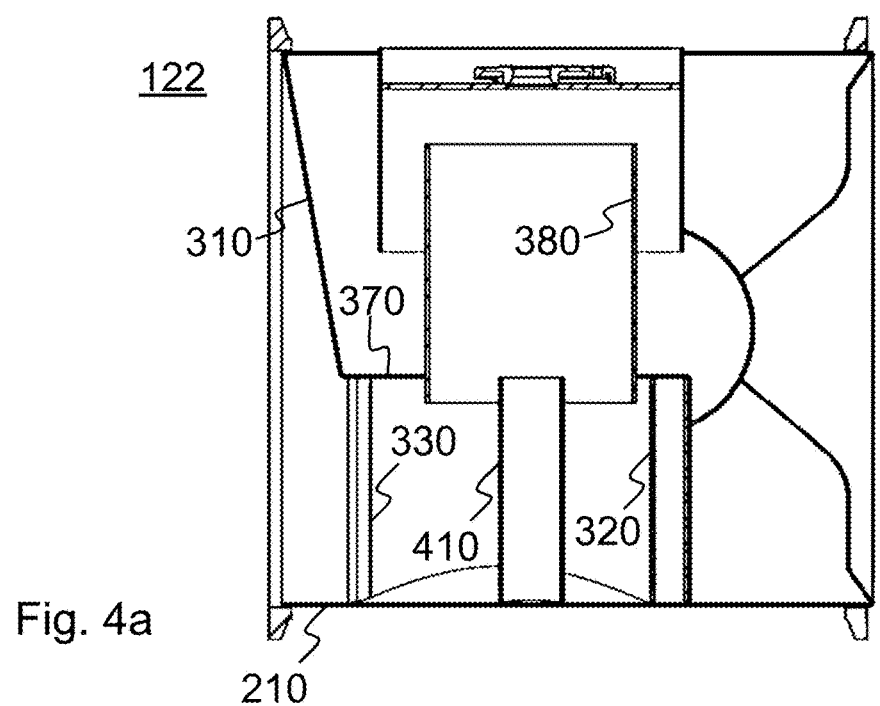
FIGS. 4*a-e* show schematic pictures of an apparatus according to third example embodiments of the present disclosure.
Figure 4B:
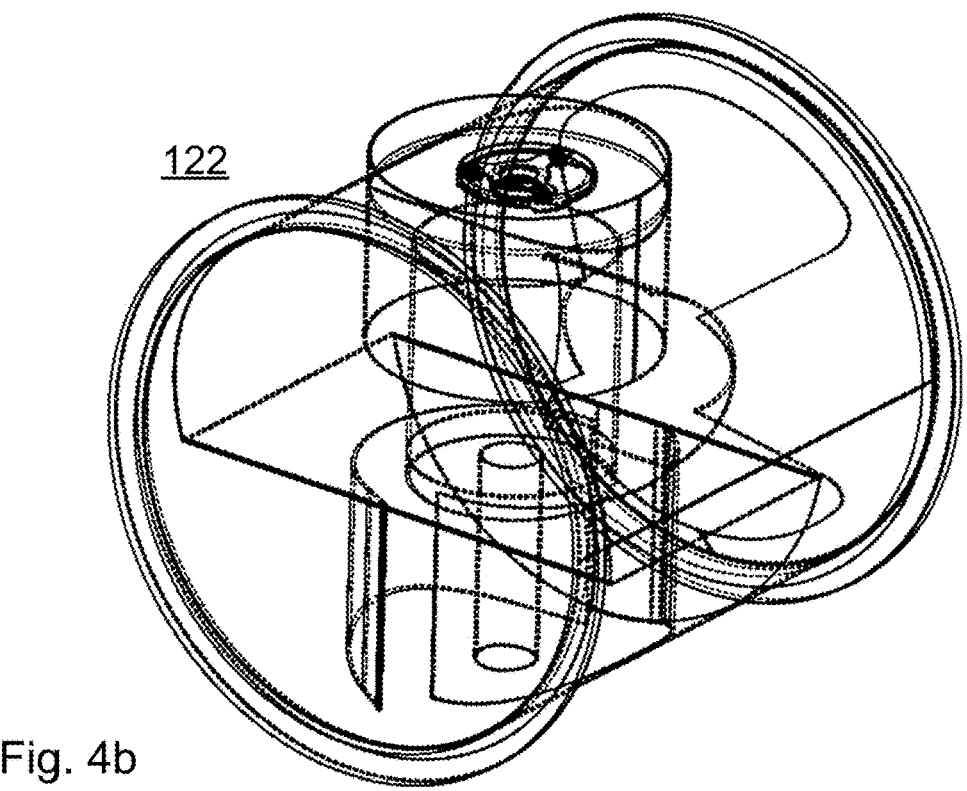
Figure 4C:
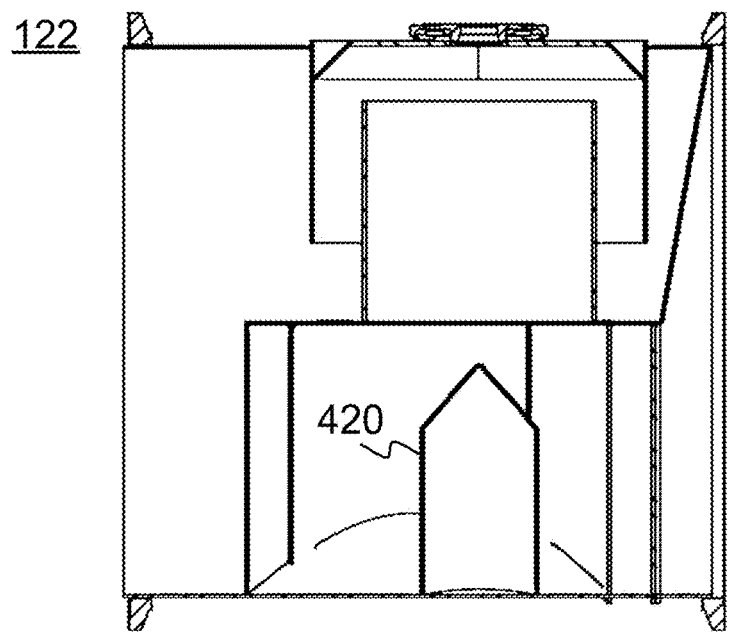
Figure 4D:
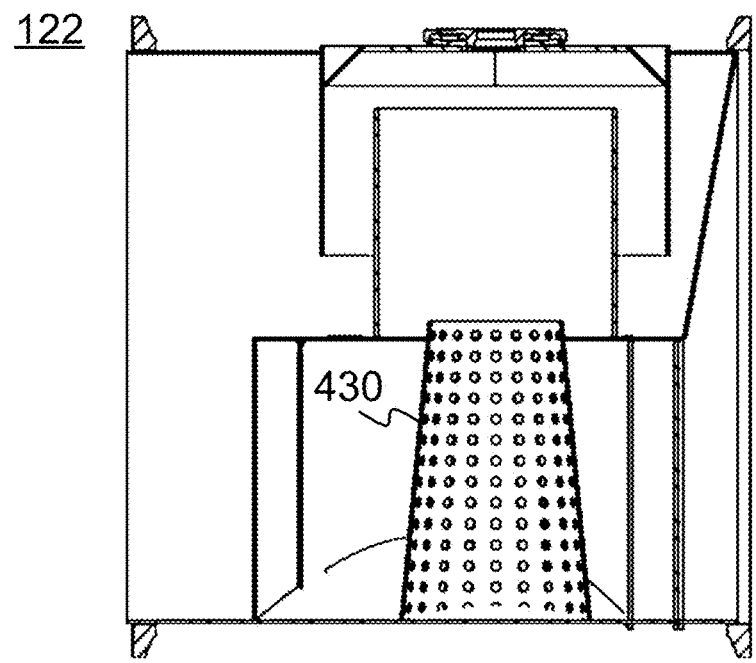
Figure 4E:
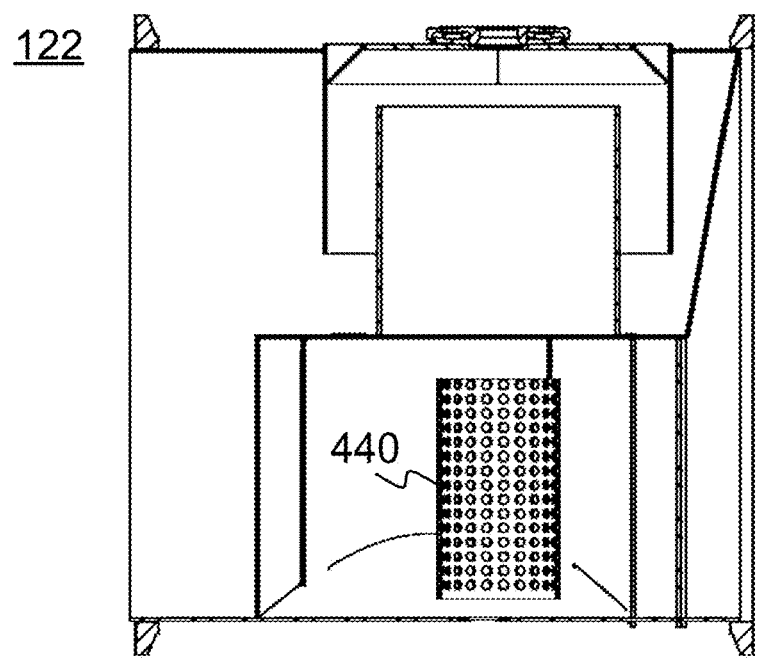

FIGS. 3a-c show schematic pictures of a mixer arrangement 122 according to second example embodiments of the invention.

In an embodiment, a first flow guide arrangement 310-330, 370-380 comprises at least one elongated blade 310 extending across a first part of the interior of the housing to guide the exhaust gas flow 201 in direction of the longitudinal axis to a second part of the interior of the housing, the first part located above the second part (parts separated by blocking plate 370). The first part corresponds in FIG. 3a to the upper interior of the housing above the blade 310 and the plate 370, whereas the second part corresponds to the lower interior of the housing below the blade 310 and the plate 370. At least one curved blade 320, 330 is located in the second part of the interior of the housing to guide the exhaust gas flow to rotating and advancing movement in direction of a crosswise axis perpendicular to the longitudinal axis. A second surface (lower surface in FIG. 3a) of a block blade 370 facing the second part of the interior of the housing prevents the rotating and advancing exhaust gas flow to access the first part of the interior of the housing outside a non-perforated tubular element 380. The non-perforated tubular element 380 allows the rotating and advancing exhaust gas flow to enter via a second (lower) open end of the non-perforated tubular element 380 to the first direction (upwards) of a crosswise axis perpendicular to the longitudinal axis. The second flow guide arrangement 370, 390 comprises a cylindrical element 390, wherein an inner diameter of the cylindrical element 390 is greater than an outer diameter of a first open end (upper) of the non-perforated tubular element 380, wherein side wall of the cylindrical element 390 extends to direction (down) of a crosswise axis and overlapping a portion of side wall of the (upper end) non-perforated tubular element 380. A first surface (upper) of the block blade 370 faces the cylindrical element 390, connects to the outer surface of the (lower end) non-perforated tubular element 380 and guides the exhaust gas flow to direction of the longitudinal axis.

The reactant inlet 220 is arranged to a closed base (upper end) of the cup-shape cylindrical element 390 and is configured to dispense a reactant into the interior of the cup-shape cylindrical element 390 in second direction (downwards) opposite to the first direction of the crosswise axis, towards the first open end (and gas flow advancing upwards) of the non-perforated tubular element 380.

In an embodiment, the reactant is dispensed from the reactant inlet 220 against the rotating and advancing exhaust gas flow into the center part of the rotating and advancing exhaust gas flow flowing through the non-perforated tubular element 380. Narrow-beam reactant inlet 220 may be configured to direct bigger droplets to travel further down the dispensing axis, whereas smaller droplets are mixed and carried away earlier by the rotating and advancing exhaust gas flow. By dispensing the reactant droplets upstream against the rotating and advancing exhaust gas flow, droplets travel first upstream (against flow) and then downstream (with flow) and thus a longer channel distance for evaporation of droplets is achieved. Furthermore, the rotating and advancing exhaust gas flow may direct the droplets out of the center dispensing axis and prevent the droplets to hit the reactant inlet 220 when carried away to downstream direction. Within the center part of the rotating and advancing exhaust gas flow, the flow direction may change so that the center flow part close to the reactant inlet moves away from the reactant inlet 220.

In an embodiment, the mixer arrangement 122 of the apparatus 120 may further comprise flow distribution arrangement 340-360 positioned within the interior of the housing 210 downstream to the reactant inlet 220 and upstream to the second substrate (not shown). The flow distribution arrangement 340-360 comprises a first flow distribution element 340 extending across the mixed exhaust gas flow (longitudinal) as an U-shape first plate configured to divide the mixed exhaust gas flow to two sub flows exiting the first flow distribution element 340 from opposite ends (left and right in FIG. 3*b*) of the U-shape first plate within the interior of the housing 210. A second flow distribution element 350, downstream to the first flow distribution element 340, extends across the interior of the housing 210 at least partially as a concave or a conical second plate, and at least two openings are defined by the second plate extending radially outwardly from a central portion of the second plate, wherein the openings increase in size as extending radially away from the central portion of the second plate 350, wherein each sub flow is allowed to flow within the interior of the housing 210 above upstream surface (lower surface in FIG. 3*b*) of the second plate 350. A tubular inner surface of the housing 210 is configured to divide each sub flow to two radial sub flows, wherein the two radial sub flows advance radially in opposite directions to meet and mix with corresponding two radial sub flows originating from another sub flow and to enter the openings towards the second substrate as a distributed exhaust gas flow in direction of the longitudinal axis. The second flow distribution element 350 may comprise a collar 360 that prevents distributed exhaust gas flow to directly enter towards the second substrate via the radial edge portion of the interior of the housing 210.

No matter the flow distribution arrangement 340-360 is shown in FIGS. 3*a-b*, the mixer arrangement 122 may also be implemented without the arrangement 340-360. The flow distribution arrangement 340-360 is further illustrated in FIG. 8.

In an embodiment (not shown in FIG. 3*a*), the non-perforated tubular element 380 of FIG. 3*a* may extend lower to the second part of the interior of the housing (even to bottom inner surface of the housing 210). The first flow guide arrangement comprises at least one elongated blade 310 extending across a first part (upper) of the interior of the housing to guide the exhaust gas flow in direction of the longitudinal axis to a second part (lower) of the interior of the housing, the first part is located above the second part. At least one curved blade 320, 330 is located in the second part of the interior of the housing to guide the exhaust gas flow to rotating and advancing movement in direction of a crosswise axis perpendicular to the longitudinal axis; and a second surface of a block blade 370 faces the second part of the interior of the housing preventing the rotating and advancing exhaust gas flow to access the first part of the interior of the housing. A tubular element 380 is arranged in direction of cross-axis allowing the rotating and advancing exhaust gas flow to enter an interior of the tubular element 380 through openings located within a second portion (lower) of the tubular element 380 exposed to the second part of the interior of the housing, whereas a first portion of the tubular element exposed to the first part of the interior of the housing is non-perforated. The second flow guide arrangement comprises a cylindrical element 390, wherein an inner diameter of the cylindrical element 390 is greater than an outer diameter of an open end of the first portion of the tubular element 380, wherein side wall of the cylindrical element 390 extends to direction of a crosswise axis and overlapping a portion of side wall of the first portion of the tubular element 380. A first surface (upper surface) of the block blade 370 faces and connects with the cylindrical element 380 and guides the exhaust gas flow to direction of the longitudinal axis. The reactant inlet 220 is arranged to a closed base of the cup-shaped cylindrical element 390 and configured to dispense a reactant into the interior of the cup-shape cylindrical element 390 in second direction opposite to the first direction of the crosswise axis towards the open end of the tubular element 380.

In an embodiment (not shown in FIG. 3*a*), a peripheral surface of the tubular element 380 (extending lower to second part, even to bottom inner surface of the housing 210) comprises openings and fins corresponding to the openings to guide exhaust gas flow to flow through the openings into the tubular element.

FIGS. 4*a-e* show schematic pictures of an apparatus according to third example embodiments of the present disclosure.

In an embodiment, the first flow guide arrangement 310-330, 370-380 further comprises an elongated pole member 410 extending in direction of a crosswise axis and located in the second part of the interior of the housing, outer diameter of the elongated pole member 410 being smaller than inner diameter of the non-perforated tubular element 380. A first end (upper end) of the elongated pole member 410 extends partially inside the non-perforated tubular element 380 and a second end (lower end) of the elongated pole member 410 is attached to an internal surface of the housing 210 within the second part of the interior of the housing.

In an embodiment, the elongated pole member 410 is cylindrical.

In an embodiment, the first flow guide arrangement further comprises an elongated pole member 420, as illustrated in FIG. 4*c*, extending in direction of a crosswise axis (upwards) and located in the second part of the interior of the housing, and the outer diameter of the elongated cylindrical pole member 420 is smaller than inner diameter of the non-perforated tubular element, a first end of the elongated pole member 420 does not extend inside the non-perforated tubular element and a second end of the elongated pole member 420 is attached to an internal surface of the housing within the second part of the interior of the housing.

In an embodiment, the elongated pole member 420 comprises a conical first end, as illustrated in FIG. 4*c*.

In an embodiment, the elongated pole member 430 is a conical perforated tubular element, as illustrated in FIG. 4*d*.

In an embodiment, the elongated pole member 440 is a perforated tubular element, as illustrated in FIG. 4*e*.

Elongated pole members 410-440 enable to improve the gas flow environment within the mixer arrangement 122 and improve the reactant mixing to the gas flow. More even gas flow and mixing may be achieved. Different sizes, shapes and perforations may be used for different types of mixers and/or engines.

In an embodiment, the elongated pole member 410-440 improves performance of the mixer arrangement 122 by generating smoother and more even rotating and advancing exhaust gas flow.

Figure 5A:
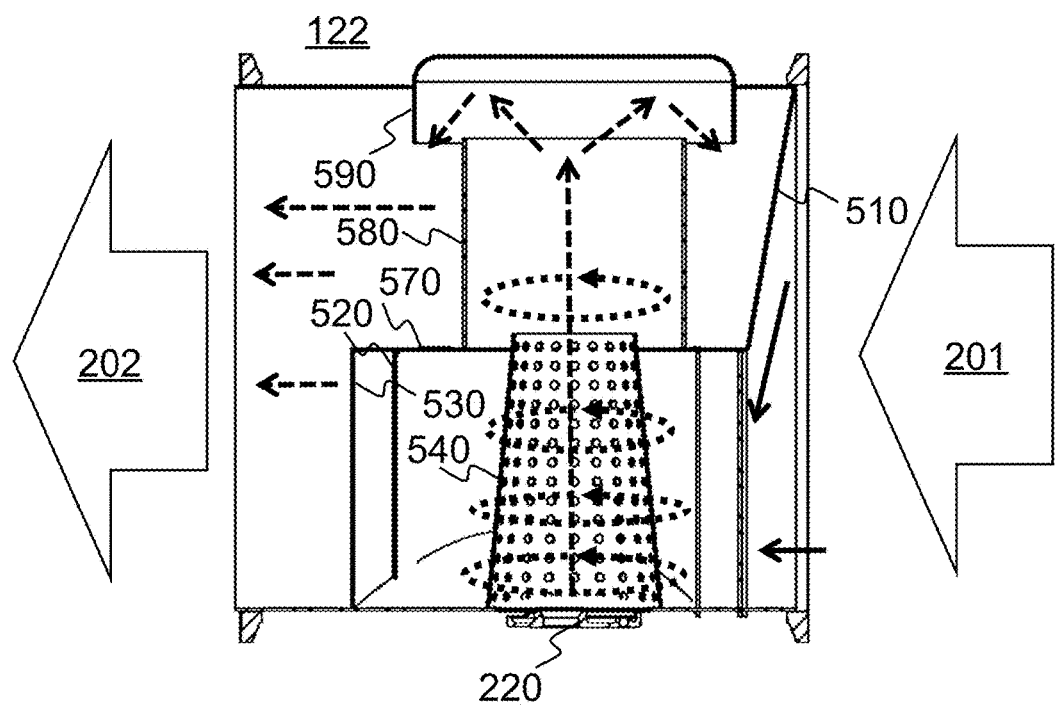
FIGS. 5*a-b* show schematic pictures of an apparatus according to fourth example embodiments of the present disclosure.
Figure 5B:
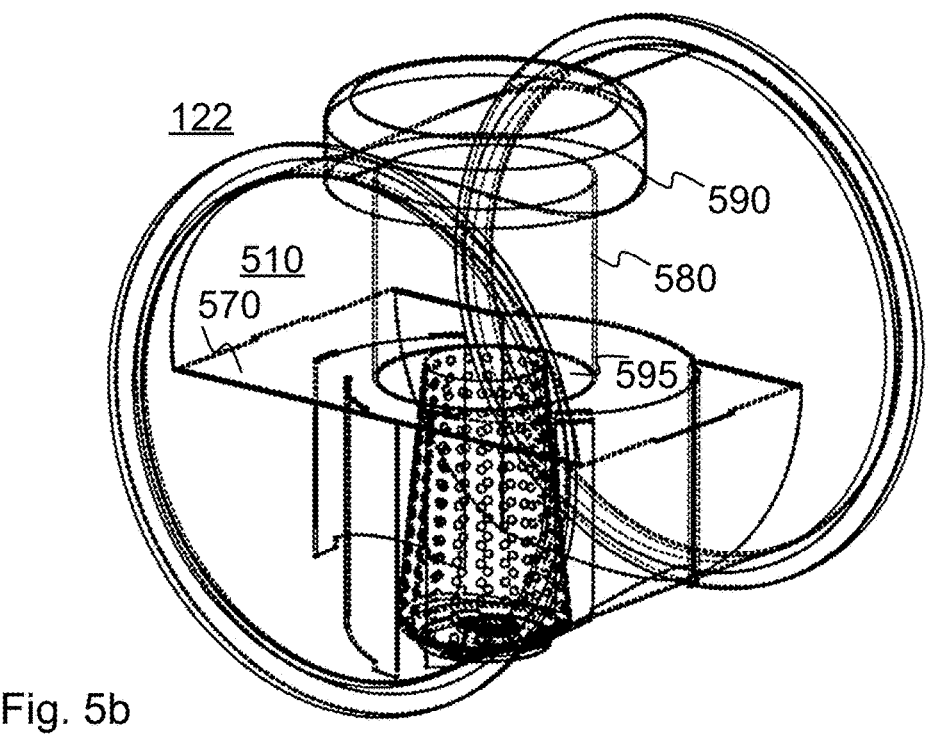

FIGS. 5a-b show schematic pictures of an apparatus according to fourth example embodiments of the present disclosure.

In an embodiment, the first flow guide arrangement comprises at least one elongated blade 510 extending across a first part (upper) of the interior of the housing to guide the exhaust gas flow 201 in direction of the longitudinal axis to a second part (lower) of the interior of the housing, the first part is located above the second part. The first flow guide arrangement further comprises at least one curved blade 520, 530 is located in the second part of the interior of the housing to guide the exhaust gas flow to rotating and advancing movement in direction (upwards) of a crosswise axis perpendicular to the longitudinal axis. The first flow guide arrangement further comprises a perforated tubular element 540, wherein at least part of the exhaust gas is configured to enter an interior of the perforated tubular element 540 through apertures, and the perforated tubular element 540 is configured to guide the exhaust gas flow to rotating and advancing movement in direction (upwards) of a crosswise axis perpendicular to the longitudinal axis, wherein a center flow advances inside the perforated tubular element 540 in the direction of the crosswise axis and the edge flow rotates and advances around the perforated tubular element 540 in direction of the crosswise axis, and the perforated tubular element 540 is conical. The first flow guide arrangement further comprises a non-perforated tubular element 580 allowing the rotating and advancing exhaust gas flow to enter a second open end (lower) of an interior of the non-perforated tubular element 580 in the first direction of a crosswise axis perpendicular to the longitudinal axis through a gap 595 between the non-perforated tubular element 580 and the perforated tubular element 540, wherein the inner diameter of the non-perforated tubular element 580 is bigger than the outer diameter (upper end) of the perforated tubular element 540. The first flow guide arrangement further comprises a second surface (lower) of a block blade 570 facing the second part of the interior of the housing preventing the rotating and advancing exhaust gas flow to access the first part of the interior of the housing outside the gap 595.

The reactant inlet 220 is configured to dispense a reactant into the interior of the perforated tubular element 540 in direction of the crosswise axis from a second end (lower) of the perforated tubular element 540 towards a first end (upper) of the perforated tubular element 540.

The second flow guide arrangement comprises a cup-shaped cylindrical element 590, wherein an inner diameter of the cylindrical element 590 is greater than an outer diameter of a downstream open end (upper) of the non-perforated tubular element 580, wherein side wall of the cup-shaped cylindrical element 590 extends to direction of a crosswise axis (downwards) and overlaps a portion of side wall of the non-perforated tubular element 580. The second flow guide arrangement further comprises a first surface (upper) of the block blade 570 that faces the cup-shaped cylindrical element 590 and connects to the non-perforated tubular element 580 and guides the mixed exhaust gas flow to direction of the longitudinal axis to enter as mixed exhaust gas flow 202 for the second substrate (not shown).

FIGS. 6a-d show schematic pictures of an apparatus according to fifth example embodiments of the present disclosure.

In an embodiment, the first flow guide arrangement comprises a mixing element 610, wherein the exhaust gas flow 201 is configured to enter an interior of the mixing element 610 through an inlet opening 620, 630 in a first part of the interior of the housing, the first part located above the second part, and the opening 620, 630 is at least partially located above a central longitudinal axis of the housing 210, and the mixing element 610 is configured to guide the exhaust gas flow to rotating and advancing movement in direction (downwards) of a crosswise axis perpendicular to the longitudinal axis inside the mixing element 610, and the mixing element 610 is cylindrical. The first flow guide arrangement may further comprise a flow guiding blade 640 to guide the exhaust gas flow 201 to enter an interior of the mixing element 610 through an inlet opening 620, 630.

The reactant inlet 220 is configured to dispense a reactant into the interior of the mixing element 610 in direction of the crosswise axis from a first end (up) of the mixing element 610 in the first part towards a second end (down) of the mixing element 610 in the second part.

The second flow guide arrangement comprises an outlet opening 650 in a second part of the interior of the housing, and the outlet opening 650 is located below a central longitudinal axis of the housing 210, and the outlet opening 650 being configured together with an inner surface (bottom) of the tubular housing 210 to guide the rotating and advancing mixed exhaust gas flow in direction of the longitudinal axis as a mixed exhaust gas flow. The second flow guide arrangement may further comprise a second flow guiding blade 660 to guide the mixed exhaust gas flow to direction of the longitudinal axis for entering as mixed exhaust gas flow 202 towards the second substrate (not shown).

Figure 6A:
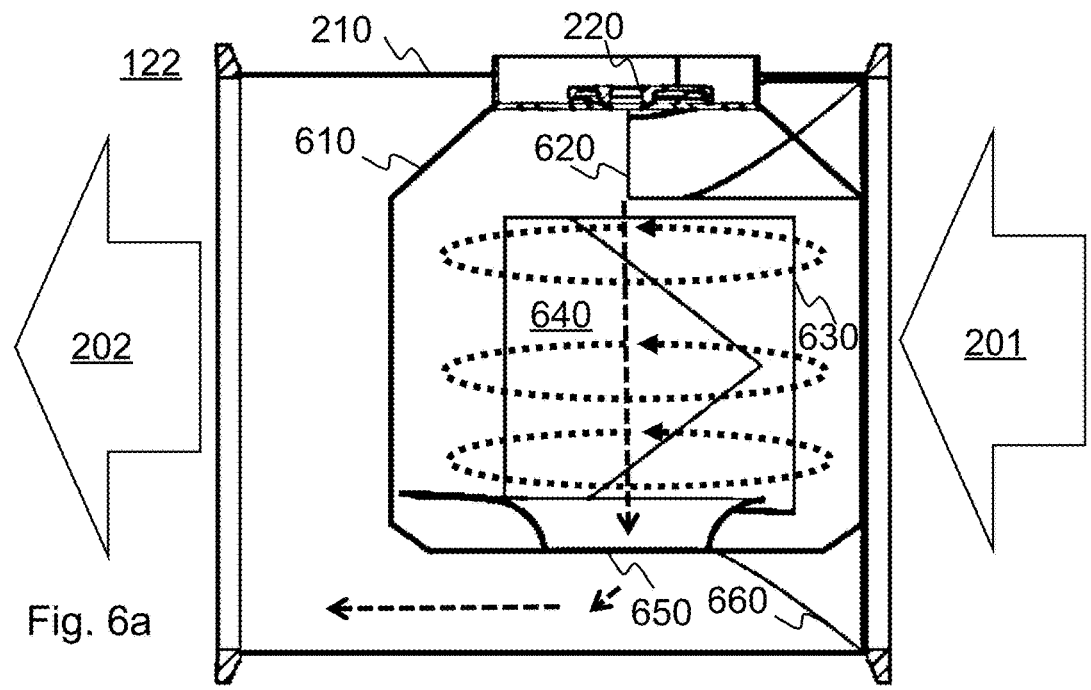
FIGS. 6*a-d* show schematic pictures of an apparatus according to fifth example embodiments of the present disclosure.
Figure 6B:
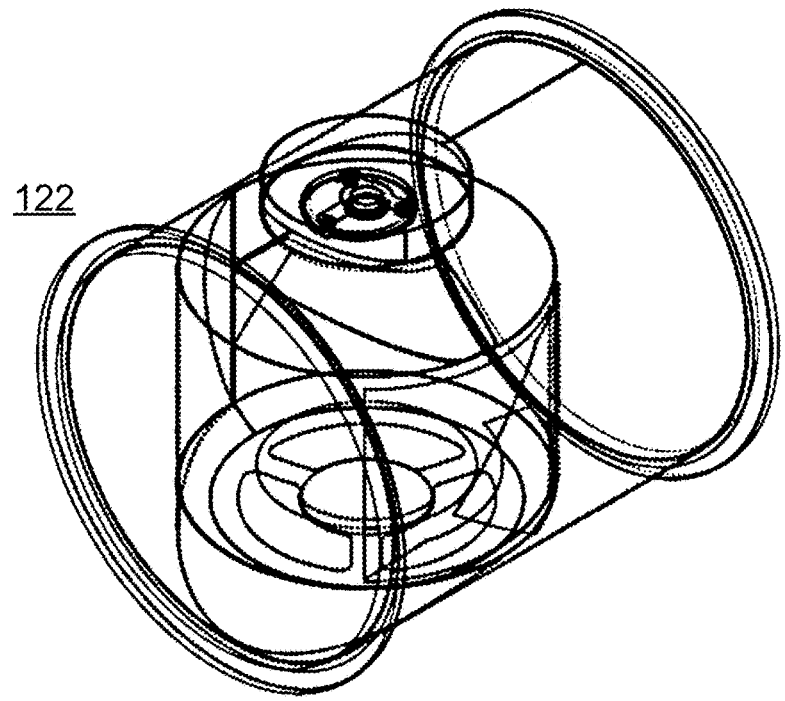
Figure 6C:
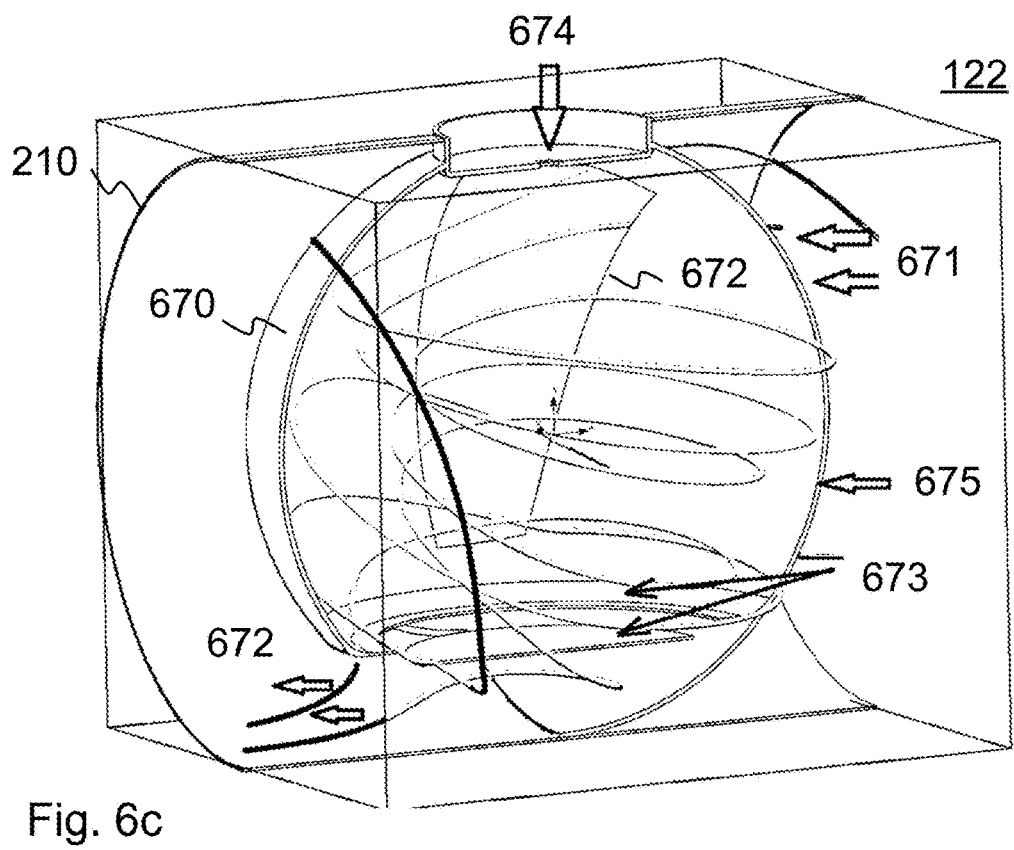
Figure 6D:
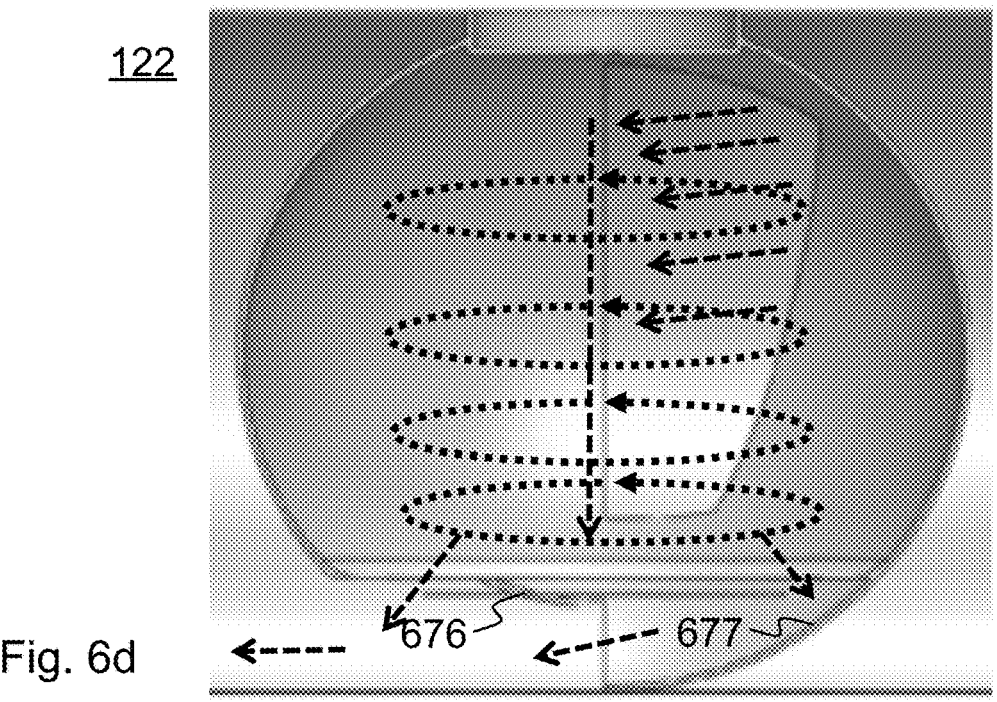

In an embodiment, the mixing element 670 is spherical, as shown in FIG. 6c.

The first flow guide arrangement comprises a mixing element 670, wherein the exhaust gas flow 671 is configured to enter an interior of the mixing element 670 through an inlet opening 672 in a first part of the interior of the housing, the first part located above the second part, and the opening 672 is at least partially located above a longitudinal central axis of the tubular housing 210, and the mixing element 670 is configured to guide the exhaust gas flow 671 to rotating and advancing movement in direction of a crosswise axis perpendicular to the longitudinal axis inside the mixing element 670 guided by inner spherical surface 650 of the mixing element 670, and the mixing element 670 is spherical. The first flow guide arrangement may further comprise at least one flow limiting blade 673 to limit the mixed exhaust gas flow from freely exiting the mixing element 670.

The reactant inlet 674 is configured to dispense a reactant into the interior of the mixing element 670 in direction of the crosswise axis from a first end (up) of the spherical mixing element 670 in the first part (upper) towards a second end (down) of the mixing element 670 in the second part (lower).

The second flow guide arrangement comprises an outlet opening 672 in a second part (lower) of the interior of the housing, and the opening 672 is located below a longitudinal central axis of the tubular housing 210. The outlet opening 672 is configured together with an inner surface (bottom) of the housing 210 and inner surface portion 677 of the spherical mixing element 670 (portion 677 below at least one flow limiting blade 673) to guide the rotating and advancing mixed exhaust gas flow in direction of the longitudinal axis as a mixed exhaust gas flow. The second flow guide arrangement may further comprise a flow guiding blade 676 to guide the mixed exhaust gas flow to direction of the longitudinal axis for entering as mixed exhaust gas flow towards the second substrate (not shown).

Figure 7:
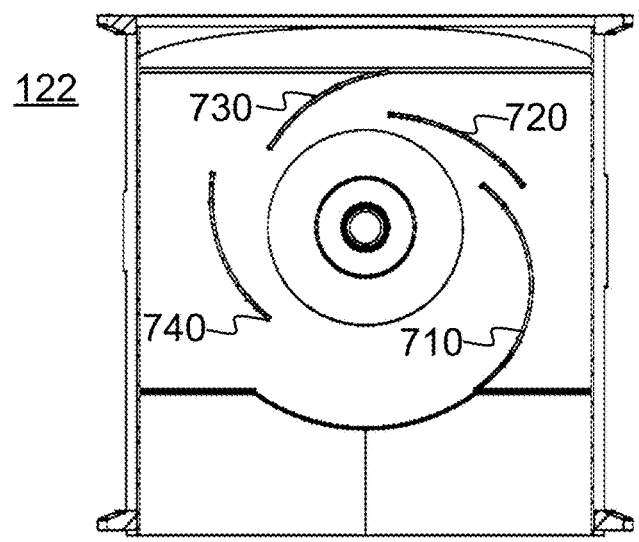
FIG. 7 shows a schematic picture of an apparatus according to sixth example embodiment of the present disclosure.

FIG. 7 shows a schematic picture of an apparatus according to sixth example embodiment of the invention.

As shown in FIGS. 2*a-b*, 3*a-b*, 4*a-e* and 5*a-b*, there are embodiments comprising two curved flow guides 260-270, 320-330, and 520-530, for example.

In an embodiment, the mixing arrangement 122 may comprise more than two curved flow guides 710-740, as shown in FIG. 7.

Figure 8:
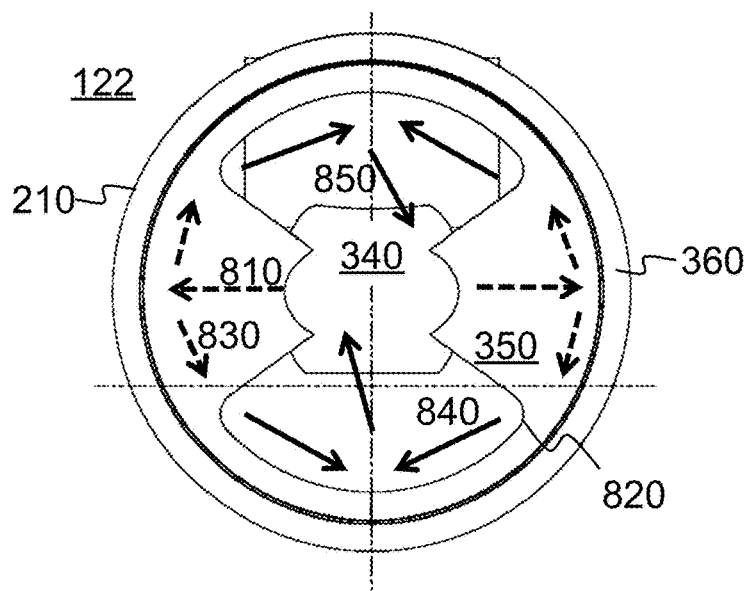
FIG. 8 shows a schematic picture of an apparatus according to seventh example embodiment of the present disclosure.

FIG. 8 shows a schematic picture of an apparatus according to seventh example embodiment of the present disclosure.

In an embodiment, the apparatus 122 may further comprise flow distribution arrangement 340-360 positioned within the interior of the housing 210 downstream to the reactant inlet and upstream to the second substrate (not shown). The flow distribution arrangement 340-360 comprises a first flow distribution element 340 extending across the mixed exhaust gas flow as an U-shape first plate configured to divide the mixed exhaust gas flow to two sub flows 810 exiting the first flow distribution element 340 from opposite ends (left and right in FIG. 8) of the U-shape first plate within the interior of the housing 210. A second flow distribution element 350, downstream to the first flow distribution element 340, extends across the interior of the housing 210 at least partially as a concave or a conical second plate, and at least two openings 820 are defined by the second plate extending radially outwardly from a central portion of the second plate, wherein the openings 820 increase in size as extending radially away from the central portion of the second plate 350, wherein each sub flow 810 is allowed to flow within the interior of the housing 210 above upstream surface of the second plate 350. A tubular inner surface of the housing 210 is configured to divide each sub flow 810 to two radial sub flows 830, wherein the two radial sub flows 830 advance radially in opposite directions to meet and mix with corresponding radial sub flows 840 originating from another sub flow and to enter the openings 820 towards the second substrate as a distributed exhaust gas flow 850 in direction of the longitudinal axis (towards the viewer in FIG. 8). The second flow distribution element 350 may comprise a radial collar 360 that prevents distributed exhaust gas flow to directly enter towards the second substrate via the radial edge portion of the interior of the housing 210.

Figure 9:
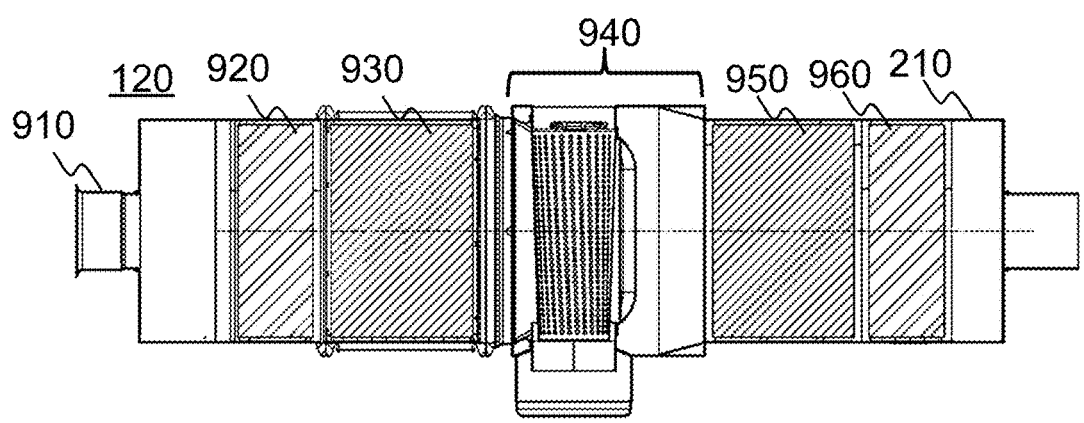
FIG. 9 shows another schematic picture of an apparatus according to the first example embodiment of the present disclosure.

FIG. 9 shows another schematic picture of an apparatus 120 for aftertreatment of exhaust gas according to the an example embodiment of the present disclosure.

In an embodiment, the exhaust inlet 910 being positioned at an end portion of the first housing end, the inlet 910 having a central axis parallel to the longitudinal axis of the housing 210. The whole apparatus 120 may be arranged within tubular housing in view of a longitudinal axis.

In an embodiment, the exhaust inlet 910 being positioned at a side portion of the first housing end, the inlet 910 having a central axis perpendicular to the longitudinal axis of the housing 210.

In an embodiment, the first substrate 920, 930 comprises at least one of the following:
a diesel oxidation catalyst (DOC) substrate; and
a diesel particulate filter (DPF).

In an embodiment, the second substrate comprises 950, 960 at least one of the following:

a selective catalytic reduction (SCR) substrate; and
a diesel particulate filter (DPF).

Downstream to the first substrate 920, 930 and upstream to the second substrate 950, 960 is arranged the mixer arrangement 940.

At least part of the exhaust gas flow may be directed to the different directions and the definition of opposite in such embodiments may be understood as essentially opposite, such as more than 135 degrees to opposite direction, for example.

Furthermore, at least part of the exhaust gas flow may be directed to parallel directions and the definition of parallel in such embodiments may be understood as essentially parallel, such as less than 45 degrees to parallel direction, for example.

By guiding the exhaust gas flow first to flow in direction of the longitudinal axis, and then guide the exhaust gas flow to rotating and advancing gas flow in direction of a crosswise axis perpendicular to the longitudinal axis, dispense reactant to the rotating and advancing gas flow, the reactant configured to mix with the exhaust gas, and eventually to guide the rotating and advancing mixed gas flow to flow in direction of the longitudinal axis as a mixed exhaust gas flow, the time for the reactant to mix with the exhaust gas is increased and the housing is kept as inline tubular design. Furthermore the length of the apparatus may be reduced and thus ease the attachment to an engine system. Since the time for the reactant to mix with the exhaust gas is increased, and such operation is arranged with the first and the second flow guide arrangements and with the placement of the reactant inlet, hitting of the reactant to the inner surface of the housing interior may be reduced and vaporization of the reactant is improved.

In an embodiment, with the help of a swirl structure of the mixer arrangement, the exhaust gas flow passed through the first substrate may be divided to a central flow flowing inside a tubular element and an edge flow surrounding the edge flow either within the tubular element and/or around the tubular element. These flows are little by little at least partially mixed and combined together within the apparatus before reaching the second substrate.

Some of the advantages and/or technical effects provided by embodiments of the invention comprise at least one of the following. First, a length of a mixing flow channel is increased without increasing the size of the apparatus too much. Second, the mixing flow channel diameter may be increased. Third, there is no dedicated reactant (e.g. ammonia or urea) concentration point within the interior of the housing or flow channel that would increase risk of urea deposits in exhaust pipelines. Fourth, turbulence of an exhaust gas flow within the mixer arrangement is reduced. Reducing the turbulence in the interior of the mixer arrangement results in that the center flow and the edge flow remain apart from each other in the beginning of a mixing procedure, whereby the reactive substance fed into the center flow does not come into contact with a wall of the housing too early before it is converted to ammonia, for example. Fifth, formation of solid deposit generated in the conversion process of urea (or some other reactant) is reduced within the interior of the housing and thus reduces the service need of the apparatus and the engine system. Furthermore, the engine system retains its operational ability and efficiency better. Sixth, when being able to design the apparatus as inline tubular housing design the placement and attachment of the apparatus to the engine system may be more freely designed. Since the deposit risk of the urea also in the bends of the housing is reduced, the designing of the aftertreatment apparatus becomes easier.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the present disclosure.

Furthermore, some of the features of the above-disclosed embodiments of this invention may be used to advantage without the corresponding use of other features. As such, the foregoing description shall be considered as merely illustrative of the principles of the present disclosure, and not in limitation thereof. Hence, the scope of the disclosed embodiments are only restricted by the appended patent claims.

The invention claimed is:

1. An apparatus for aftertreatment of exhaust gas comprising:
    a housing having a longitudinal axis that extends between a first end and a second end of the housing;
    an exhaust inlet being positioned at a portion of the first end of the housing for entering exhaust gas flow into the interior of the housing;
    mixer arrangement being positioned within the interior of the housing downstream to the exhaust inlet and comprising:
        first flow guide arrangement configured to guide the exhaust gas flow to rotating and advancing gas flow in a first direction of a crosswise axis perpendicular to the longitudinal axis;
        a reactant inlet for dispensing reactant to the rotating and advancing gas flow, the reactant configured to mix with the exhaust gas; and
        second flow guide arrangement configured to guide the rotating and advancing mixed gas flow in direction of the longitudinal axis as a mixed exhaust gas flow; and
    a substrate being positioned within the interior of the housing downstream to the mixer arrangement, wherein the mixed exhaust gas flow being configured to flow through the substrate, wherein the reactant inlet is configured to dispense reactant in a second direction of a crosswise axis perpendicular to the longitudinal axis, the second direction being opposite to the first direction;
    the first flow guide arrangement comprising:
        at least one elongated blade extending across a first part of the interior of the housing to guide the exhaust gas flow in direction of the longitudinal axis to a second part of the interior of the housing, the first part located above the second part;
        at least one curved blade located in the second part of the interior of the housing to guide the exhaust gas flow to rotating and advancing movement in a direction of a crosswise axis perpendicular to the longitudinal axis; and
        a second surface of a block blade facing the second part of the interior of the housing preventing the rotating and advancing exhaust gas flow to access the first part of the interior of the housing;
        a non-perforated tubular element allowing the rotating and advancing exhaust gas flow to enter a second open end of an interior of the non-perforated tubular element in the first direction of a crosswise axis perpendicular to the longitudinal axis;
    the second flow guide arrangement comprising:
        a cup-shaped cylindrical element, wherein an interior diameter of the cup-shaped cylindrical element is greater than an outer diameter of a first open end of the non-perforated tubular element, wherein side wall of the cup-shaped cylindrical element extends to direction of a crosswise axis and overlapping a portion of side wall of the non-perforated tubular element; and
        a first surface of the block blade facing the cup-shaped cylindrical element and guiding the exhaust gas flow to direction of the longitudinal axis; and
        the reactant inlet arranged to a closed base of the cup-shape cylindrical element and configured to dispense a reactant into the interior of the cup-shape cylindrical element in second direction opposite to the first direction of the crosswise axis towards the first open end of the non-perforated tubular element.

2. The apparatus of claim 1, wherein the exhaust inlet being positioned at an end portion of the first housing end, the inlet having a central axis parallel to the longitudinal axis of the housing, the exhaust gas flow being configured to flow in direction of the longitudinal axis between the exhaust inlet and the mixer arrangement and through the substrate.

3. The apparatus of claim 1, further comprising a first substrate positioned within the interior of the housing downstream to the exhaust inlet, wherein the Response to Final Office Action dated 1 Apr. 2019 exhaust gas flow being configured to flow through the first substrate in direction of the longitudinal axis, and wherein the substrate comprises a second substrate positioned within the interior of the housing downstream to the mixer arrangement, wherein the mixed exhaust gas flow being configured to flow through the second substrate in direction of the longitudinal axis.

4. The apparatus of claim 3, wherein the first substrate comprises at least one of the following: a diesel oxidation catalyst (DOC) substrate; and a diesel particulate filter (DPF), and the second substrate comprises at least one of the following: a selective catalytic reduction (SCR) substrate; and a diesel particulate filter (DPF).

5. The apparatus of claim 1, further comprising flow distribution arrangement positioned within the interior of the housing downstream to the mixer arrangement, the flow distribution arrangement comprising:
    a first flow distribution element extending across the mixed exhaust gas flow as an U-shape first plate configured to divide the mixed exhaust gas flow to two sub flows exiting the first flow distribution element from opposite ends of the U-shape first plate within the interior of the housing;

a second flow distribution element, downstream to the first flow distribution element, extending across the interior of the housing at least partially as a concave or a conical second plate, at least two openings defined by the second plate extending radially outwardly from a central portion of the second plate, the openings increase in size as extending radially away from the central portion of the second plate, wherein each sub flow is allowed to flow within the interior of the housing above upstream surface of the second plate, a tubular inner surface of the housing configured to divide each sub flow to two radial sub flows, wherein the further two sub flows advancing radially in opposite directions to meet and mix with corresponding two radial sub flows originating from another sub flow and to enter the openings towards the second substrate as a distributed gas flow in direction of the longitudinal axis.

6. The apparatus of claim 1, wherein
the first flow guide arrangement comprises:
   at least one elongated blade extending across at least a portion of the interior of the housing; and
   a perforated tubular element, wherein at least part of the exhaust gas is configured to enter an interior of the perforated tubular element through apertures, and the perforated tubular element being configured to guide the exhaust gas to rotating and advancing movement in direction of a crosswise axis perpendicular to the longitudinal axis, wherein a center flow advances inside the perforated tubular element in direction of the crosswise axis and the edge flow rotates and advances around the perforated tubular element in direction of the crosswise axis, and the perforated tubular element is conical;
the reactant inlet is configured to dispense a reactant into the interior of the perforated tubular element in direction of the crosswise axis from a first end of the perforated tubular element towards a second end of the perforated tubular element; and
the second flow guide comprising a cup-shaped cylindrical element extending in direction of the crosswise axis outside an external surface of the housing and enhancing interior of the housing, wherein an inner diameter of the cup-shaped cylindrical element is greater than an outer diameter of the second end of the perforated tubular element.

7. The apparatus of claim 6, further comprising:
a non-perforated tubular element downstream to the perforated tubular element and upstream to the cup-shaped cylindrical element, configured to guide at least part of the flow in direction of the crosswise axis towards the cup-shaped cylindrical element, a diameter of the non-perforated tubular element being greater than a diameter of a second end of the perforated tubular element and allowing a part of the rotating and advancing edge flow around the perforated tubular element to enter the non-perforated tubular element, and the cup-shaped cylindrical element comprising a circular open end, the diameter of the circular open end being greater than a diameter of a solid tubular element.

8. The apparatus of claim 1, wherein
the first flow guide arrangement comprises:
   at least one elongated blade extending across a first part of the interior of the housing to guide the exhaust gas flow in direction of the longitudinal axis to a second part of the interior of the housing, the first part located above the second part;
   at least one curved blade located in the second part of the interior of the housing to guide the exhaust gas flow to rotating and advancing movement in direction of a crosswise axis perpendicular to the longitudinal axis;
   a second surface of a block blade facing the second part of the interior of the housing preventing the rotating and advancing exhaust gas flow to access the first part of the interior of the housing; and
   a tubular element arranged in direction of cross-axis allowing the rotating and advancing exhaust gas flow to enter an interior of the perforated tubular through openings located within a second portion of the tubular element exposed to the second part of the interior of the housing, whereas a first portion of the tubular element exposed to the first part of the interior of the housing is non-perforated;
the second flow guide arrangement comprising:
   a cup-shaped cylindrical element, wherein an inner diameter of the cup-shaped cylindrical element is greater than an outer diameter of an open end of the first portion of the tubular element, wherein side wall of the cup-shaped cylindrical element extends to direction of a crosswise axis and overlapping a portion of side wall of the first portion of the tubular element; and
   a first surface of the block blade facing the cup-shaped cylindrical element and guiding the exhaust gas flow to direction of the longitudinal axis; and
the reactant inlet arranged to a closed base of the cup-shaped cylindrical element and configured to dispense a reactant into the interior of the cup-shaped cylindrical element in second direction opposite to the first direction of the crosswise axis towards the open end of the tubular element.

9. The apparatus of claim 8, wherein a peripheral surface of the tubular element comprises openings and fins corresponding to the openings to guide exhaust gas flow to flow through the openings into the tubular element.

10. The apparatus of claim 1, wherein the first flow guide arrangement further comprises an elongated pole member extending in direction of a crosswise axis and located in the second part of the interior of the housing, outer diameter of the elongated cylindrical pole member being smaller than inner diameter of the non-perforated tubular element, a first end of the elongated pole member extending partially inside the non-perforated tubular element and a second end of the elongated pole member attached to an internal surface of the housing within the second part of the interior of the housing.

11. The apparatus of claim 10, wherein the elongated pole member is cylindrical.

12. The apparatus of claim 11, wherein the elongated pole member comprises a conical first end.

13. The apparatus of claim 10, wherein the elongated pole member is a conical perforated tubular element.

14. The apparatus of claim 1, wherein the first flow guide arrangement further comprises an elongated pole member extending in direction of a crosswise axis and located in the second part of the interior of the housing, outer diameter of the elongated cylindrical pole member being smaller than inner diameter of the non-perforated tubular element, a first end of the elongated pole member not extending inside the non-perforated tubular element and a second end of the elongated pole member attached to an internal surface of the housing within the second part of the interior of the housing.

15. The apparatus of claim 14, wherein the elongated pole member is a perforated tubular element.

16. The apparatus of claim 1, wherein
the first flow guide arrangement comprises
  at least one elongated blade extending across a first part of the interior of the housing to guide the exhaust gas flow in direction of the longitudinal axis to a second part of the interior of the housing, the first part located above the second part;
  at least one curved blade located in the second part of the interior of the housing to guide the exhaust gas flow to rotating and advancing movement in direction of a crosswise axis perpendicular to the longitudinal axis;
  a perforated tubular element, wherein at least part of the exhaust gas is configured to enter an interior of the perforated tubular element through apertures, and the perforated tubular element being configured to guide the exhaust gas to rotating and advancing movement in direction of a crosswise axis perpendicular to the longitudinal axis, wherein a center flow advances inside the perforated tubular element in direction of the crosswise axis and the edge flow rotates and advances around the perforated tubular element in direction of the crosswise axis, and the perforated tubular element is conical;
  a non-perforated tubular element allowing the rotating and advancing exhaust gas flow to enter a second open end of an interior of the non-perforated tubular element in the first direction of a crosswise axis perpendicular to the longitudinal axis through a gap between the non-perforated tubular element and the perforated tubular element, wherein the inner diameter of the non-perforated tubular element is bigger than the outer diameter of the perforated tubular element; and
  a second surface of a block blade facing the second part of the interior of the housing preventing the rotating and advancing exhaust gas flow to access the first part of the interior of the housing outside the gap;
the reactant inlet is configured to dispense a reactant into the interior of the perforated tubular element in direction of the crosswise axis from a second end of the perforated tubular element towards a first end of the perforated tubular element; and
the second flow guide arrangement comprising:
  a cup-shaped cylindrical element, wherein an inner diameter of the cup-shaped cylindrical element is greater than an outer diameter of a downstream open end of the non-perforated tubular element, wherein side wall of the cup-shaped cylindrical element extends to direction of a crosswise axis and overlapping a portion of side wall of the non-perforated tubular element; and
  a first surface of the block blade facing the cup-shaped cylindrical element and guiding the exhaust gas flow to direction of the longitudinal axis.

17. The apparatus of claim 1, wherein
the first flow guide arrangement comprises a mixing element, wherein the exhaust gas flow is configured to enter an interior of the element through an inlet opening in a first part of the interior of the housing, the first part located above the second part, and the opening is located above a central axis of the housing, and the mixing element being configured to guide the exhaust gas to rotating and advancing movement in direction of a crosswise axis perpendicular to the longitudinal axis inside the element, and the mixing element being spherical or cylindrical;
  the reactant inlet is configured to dispense a reactant into the interior of the mixing element in direction of the crosswise axis from a first end of the mixing element in the first part towards a second end of the mixing element in the second part; and
  the second flow guide comprising an outlet opening in a second part of the interior of the housing, and the opening is located below a central axis of the housing, and the outlet opening being configured together with an inner surface of the housing to guide the rotating and advancing mixed gas flow in direction of the longitudinal axis as a mixed exhaust gas flow.

18. A combustion engine comprising an apparatus for aftertreatment of exhaust gas comprising:
  a housing having a longitudinal axis that extends between a first end and a second end of the housing;
  an exhaust inlet being positioned at a portion of the first end of the housing for entering exhaust gas flow into the interior of the housing, wherein the exhaust gas flow being configured to flow in direction of the longitudinal axis;
  mixer arrangement being positioned within the interior of the housing downstream to the exhaust inlet and comprising:
    first flow guide arrangement configured to guide the exhaust gas flow to rotating and advancing gas flow in a first direction of a crosswise axis perpendicular to the longitudinal axis;
    a reactant inlet configured for dispensing reactant to the rotating and advancing gas flow in a second direction of a crosswise axis perpendicular to the longitudinal axis, the second direction being opposite to the first direction, the reactant configured to mix with the exhaust gas; and
    second flow guide arrangement configured to guide the rotating and advancing mixed gas flow in direction of the longitudinal axis as a mixed exhaust gas flow; and
  a substrate being positioned within the interior of the housing downstream to the mixer arrangement, wherein the mixed exhaust gas flow being configured to flow through the second substrate in direction of the longitudinal axis;
the first flow guide arrangement comprising:
  at least one elongated blade extending across a first part of the interior of the housing to guide the exhaust gas flow in direction of the longitudinal axis to a second part of the interior of the housing, the first part located above the second part;
  at least one curved blade located in the second part of the interior of the housing to guide the exhaust gas flow to rotating and advancing movement in a direction of a crosswise axis perpendicular to the longitudinal axis; and
  a second surface of a block blade facing the second part of the interior of the housing preventing the rotating and advancing exhaust gas flow to access the first part of the interior of the housing;
  a non-perforated tubular element allowing the rotating and advancing exhaust gas flow to enter a second open end of an interior of the non-perforated tubular element in the first direction of a crosswise axis perpendicular to the longitudinal axis;
the second flow guide arrangement comprising:
  a cup-shaped cylindrical element, wherein an interior diameter of the cup-shaped cylindrical element is greater than an outer diameter of a first open end of the non-perforated tubular element, wherein side wall of the cup-shaped cylindrical element extends to direction of a crosswise axis and overlapping a portion of side wall of the non-perforated tubular element; and a first surface of the block blade facing the cup-shaped cylindrical element and guiding the exhaust gas flow to direction of the longitudinal axis; and the reactant inlet arranged to a closed base of the cup-shape cylindrical element and configured to dispense a reactant into the interior of the cup-shape cylindrical element in second direction opposite to the first direction of the crosswise axis towards the first open end of the non-perforated tubular element.

* * * * *